United States Patent
Johnson

(10) Patent No.: US 10,109,099 B2
(45) Date of Patent: Oct. 23, 2018

(54) METHOD AND APPARATUS FOR EFFICIENT USE OF GRAPHICS PROCESSING RESOURCES IN A VIRTUALIZED EXECUTION ENVIORNMENT

(71) Applicant: Stephen P. Johnson, San Jose, CA (US)

(72) Inventor: Stephen P. Johnson, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 55 days.

(21) Appl. No.: 15/280,446

(22) Filed: Sep. 29, 2016

(65) Prior Publication Data

US 2018/0089881 A1    Mar. 29, 2018

(51) Int. Cl.
| | |
|---|---|
| *G06T 15/00* | (2011.01) |
| *G06T 17/10* | (2006.01) |
| *G06F 9/48* | (2006.01) |
| *G06F 9/455* | (2018.01) |
| *G06T 15/04* | (2011.01) |
| *G06T 15/80* | (2011.01) |

(52) U.S. Cl.
CPC ............ *G06T 15/005* (2013.01); *G06F 9/455* (2013.01); *G06F 9/4881* (2013.01); *G06T 17/10* (2013.01); *G06T 15/04* (2013.01); *G06T 15/80* (2013.01)

(58) Field of Classification Search
CPC ...... G06F 9/5027; G06F 9/455; G06F 9/4881; G06T 15/005; G06T 17/10; G06T 15/80; G06T 15/04

USPC ......................................................... 345/419
See application file for complete search history.

(56) References Cited

U.S. PATENT DOCUMENTS

| | | | |
|---|---|---|---|
| 7,650,603 B2 * | 1/2010 | Green ....................... G06T 1/00 345/501 |
| 8,375,368 B2 * | 2/2013 | Tuck ................... G06F 11/3404 717/130 |

(Continued)

FOREIGN PATENT DOCUMENTS

| | | |
|---|---|---|
| WO | 2014058299 A1 | 4/2014 |
| WO | 2016145632 A1 | 9/2016 |

OTHER PUBLICATIONS

Infrastructure, VMware. "Resource management with VMware DRS." VMware Whitepaper 13 (2006).*

(Continued)

*Primary Examiner* — Phu K Nguyen
(74) *Attorney, Agent, or Firm* — Nicholson De Vos Webster & Elliott LLP

(57) ABSTRACT

An apparatus and method are described for an efficient multi-GPU virtualization environment. For example, one embodiment of an apparatus comprises: a plurality of graphics processing units (GPUs) to be shared by a plurality of virtual machines (VMs) within a virtualized execution environment; a shared memory to be shared between the plurality of VMs and GPUs executed within the virtualized graphics execution environment; the GPUs to collect performance data related to execution of commands within command buffers submitted by the VMs, the GPUs to store the performance data within the shared memory; and a GPU scheduler and/or driver to schedule subsequent command buffers to the GPUs based on the performance data.

28 Claims, 19 Drawing Sheets

(56) References Cited

U.S. PATENT DOCUMENTS

| | | | |
|---|---|---|---|
| 8,719,464 B2* | 5/2014 | Kegel | G06F 13/28 710/22 |
| 8,745,603 B2* | 6/2014 | McGuire | G06F 8/45 717/140 |
| 8,972,943 B2* | 3/2015 | Papakipos | G06F 9/5027 714/35 |
| 9,164,787 B2* | 10/2015 | Xu | G06F 9/45545 |
| 9,223,633 B2* | 12/2015 | Shuler | G06F 9/5077 |
| 9,323,550 B2* | 4/2016 | Lim | G06F 9/5077 |
| 9,407,944 B1 | 8/2016 | Galdy et al. | |
| 9,588,657 B1* | 3/2017 | Grechishkin | G06F 9/4443 |
| 9,606,936 B2* | 3/2017 | Kegel | G06F 12/1081 |
| 9,619,349 B2* | 4/2017 | Zhou | G06F 11/2094 |
| 2014/0176583 A1 | 6/2014 | Abiezzi et al. | |
| 2015/0371354 A1 | 12/2015 | Petersen et al. | |
| 2015/0371355 A1 | 12/2015 | Chen et al. | |

OTHER PUBLICATIONS

He L, Zou D, Zhang Z, Yang K, Jin H, Jarvis SA. Optimizing resource consumptions in clouds. InGrid Computing (GRID), 2011 12th IEEE/ACM International Conference on Sep. 21, 2011 (pp. 42-49). IEEE.*

Grant AB, Eluwole OT. Cloud resource management—Virtual machines competing for limited resources. InELMAR, 2013 55th International Symposium Sep. 25, 2013 (pp. 269-274). IEEE.*

International Search Report and Written Opinion for Application No. PCT/US2017/047788, dated Nov. 28, 2017, 14 pages.

* cited by examiner

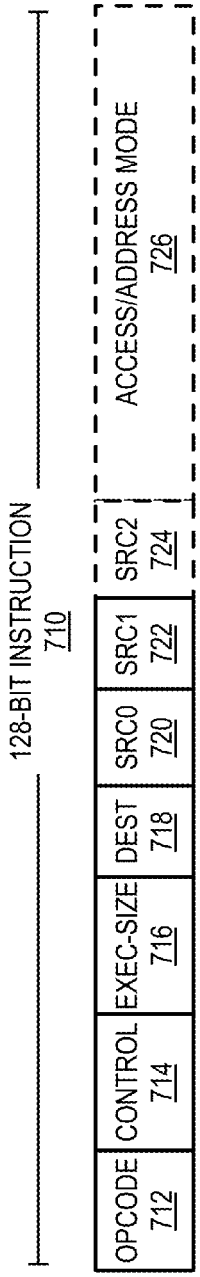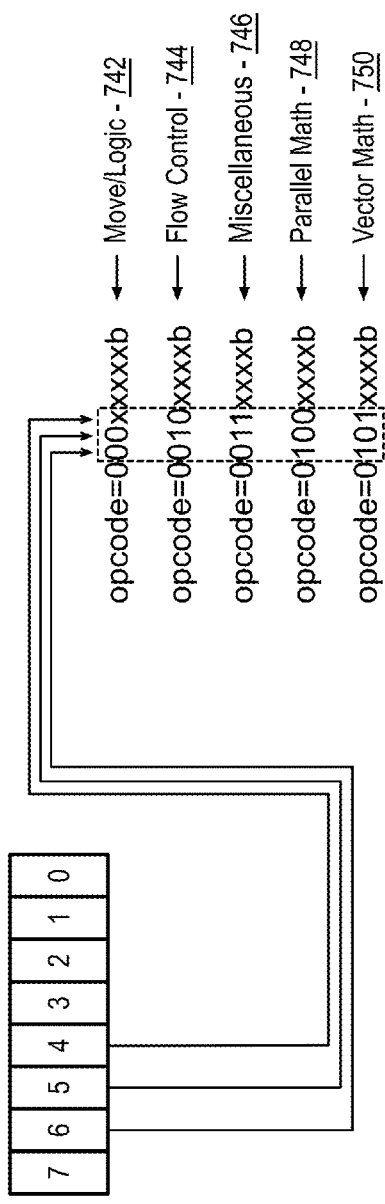
FIG. 7

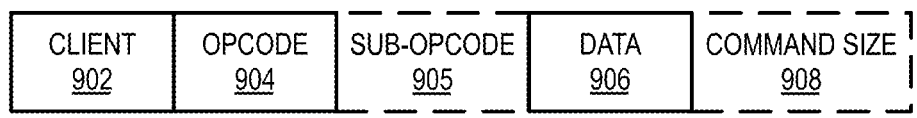
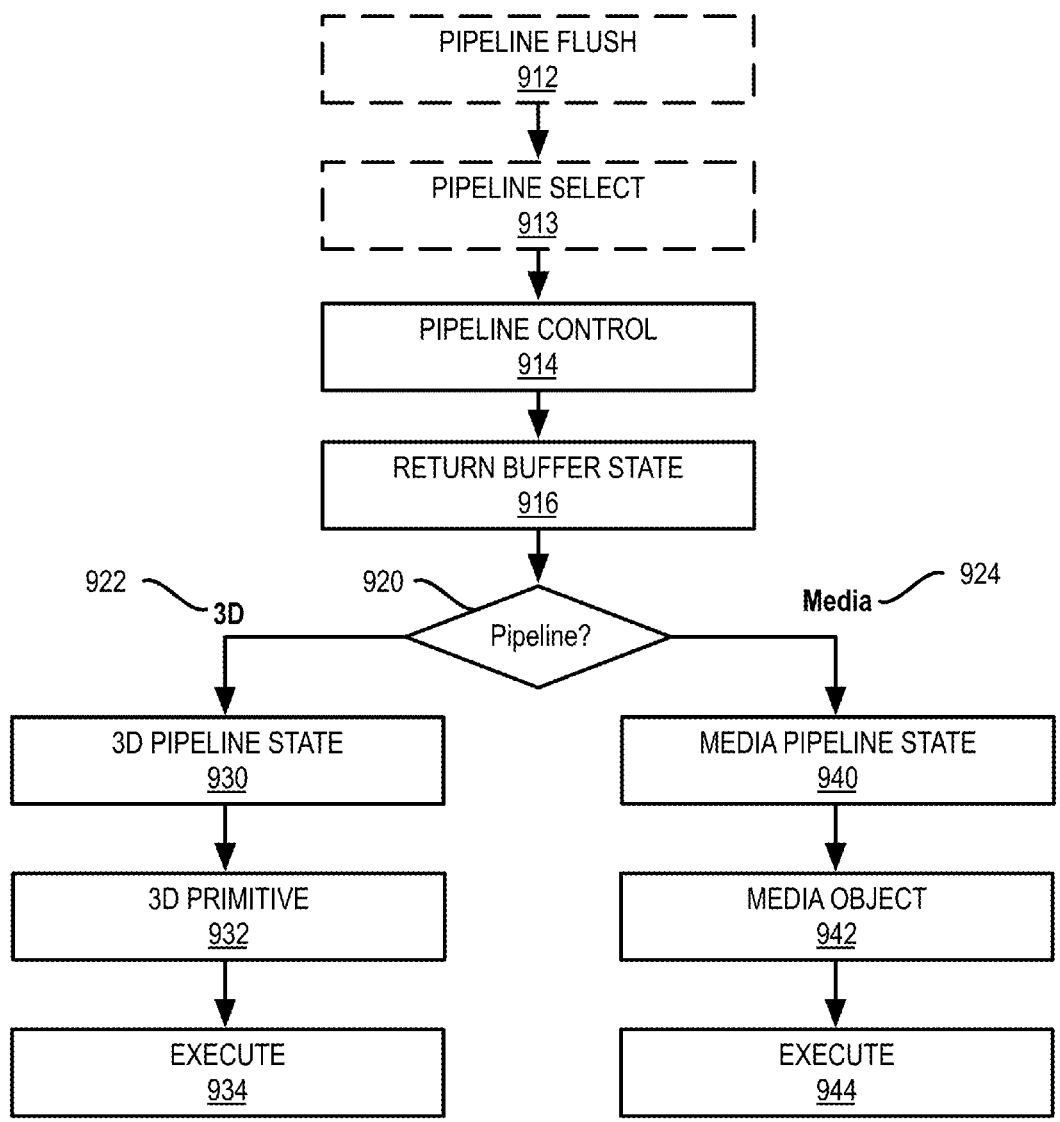

METHOD AND APPARATUS FOR EFFICIENT USE OF GRAPHICS PROCESSING RESOURCES IN A VIRTUALIZED EXECUTION ENVIORNMENT

BACKGROUND

Field of the Invention

This invention relates generally to the field of computer processors. More particularly, the invention relates to an apparatus and method for efficient use of graphics processing resources in a virtualized execution environment.

Description of the Related Art

Current solutions to using graphics processing unit (GPU) hardware in a Hypervisor virtual machine server environment provide little or no mechanism to efficiently use host multiple GPU hardware resources. Existing solutions for using GPUs in a server environment do not allow pre-emptive GPU hardware context switching based on load balancing algorithms or guest rendering patterns. They also do not allow the Hypervisor to control the pre-emption algorithm based on server management software parameters. The problem is that existing solutions do not allow the Hypervisor software enough control over the submission of command buffers to multiple host GPUs based on guest usage patterns or server management software. This can create a situation of underutilization within the available host GPU domain.

One reason a guest might underutilize a host GPU is that rendering software in any guest has no knowledge of the host environment. The guest software assumes it "owns" the GPU completely and command buffers sent to the GPU reflect the lack of global or Hypervisor knowledge within the guest software. Rendering software in the guest virtual machine has no knowledge of host GPU hardware resources including the number of GPUs available, amount of memory, number of execution units, load on the host GPU engines, rendering or compute load on GPU hardware, or server rendering activity changes due to command buffers submitted from other guests. The guest OS is unaware of server GPU workloads that contain display output commands, 3D rendering commands, video decode or video encode, and pixel copy/convert operations. Only the host GPU hardware and/or kernel mode driver has the information necessary to load balance the workloads from guests and only the Hypervisor software can properly deliver guest command buffers to the appropriate GPU for specific tasks like display output or video encode. In addition, there are varying conditions of activity that cause underutilization or over commitment of host GPU hardware resources.

BRIEF DESCRIPTION OF THE DRAWINGS

A better understanding of the present invention can be obtained from the following detailed description in conjunction with the following drawings, in which:

FIG. 7 illustrates a graphics processor execution unit instruction format according to an embodiment;

FIG. 9A is a block diagram illustrating a graphics processor command format according to an embodiment;

FIG. 9B is a block diagram illustrating a graphics processor command sequence according to an embodiment;

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Graphics Processor Architectures and Data Types

System Overview

Figure 1:
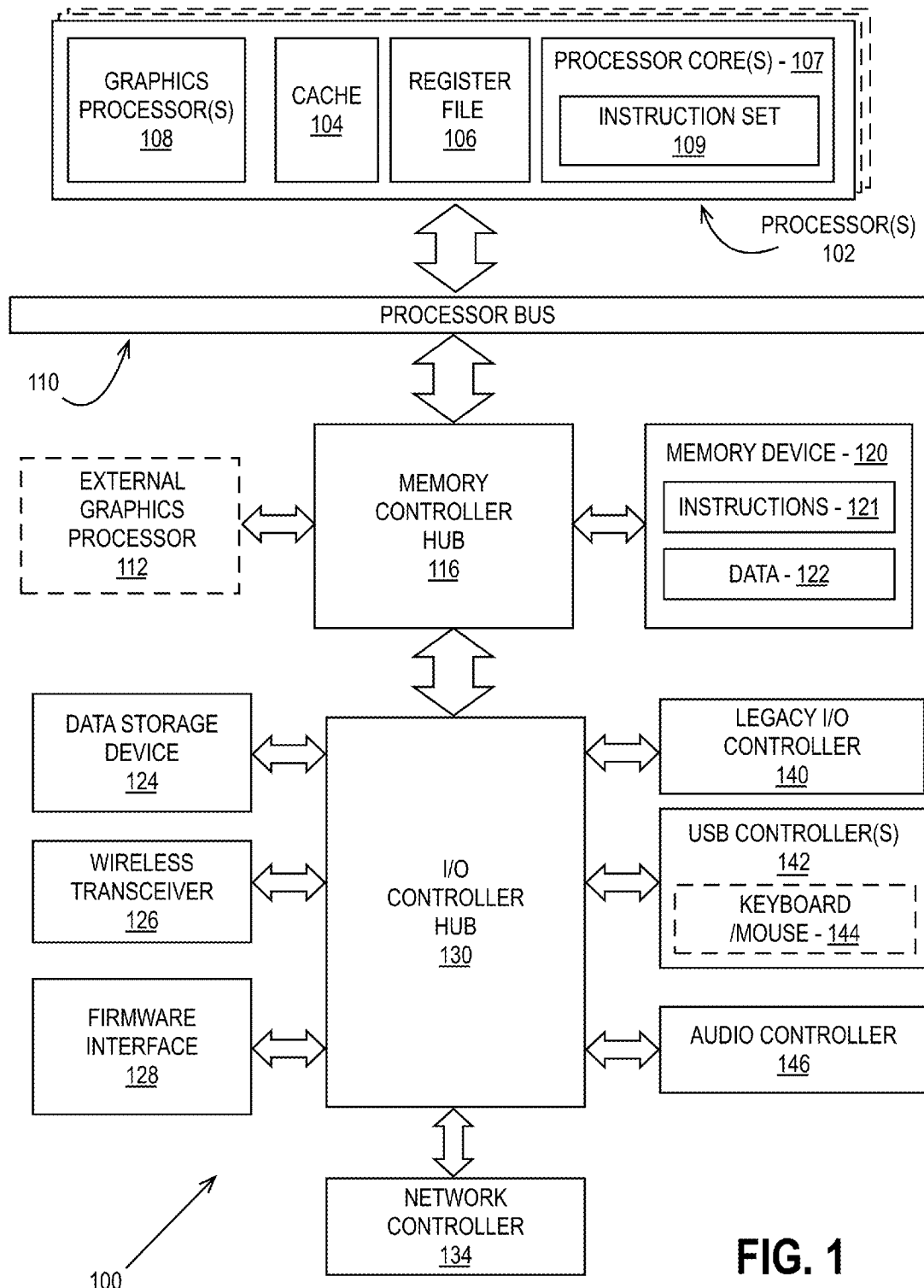
FIG. 1 is a block diagram of an embodiment of a computer system with a processor having one or more processor cores and graphics processors.

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In one embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled with a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple with ICH 130. In some embodiments, a high-performance network controller (not shown) couples with processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 2:
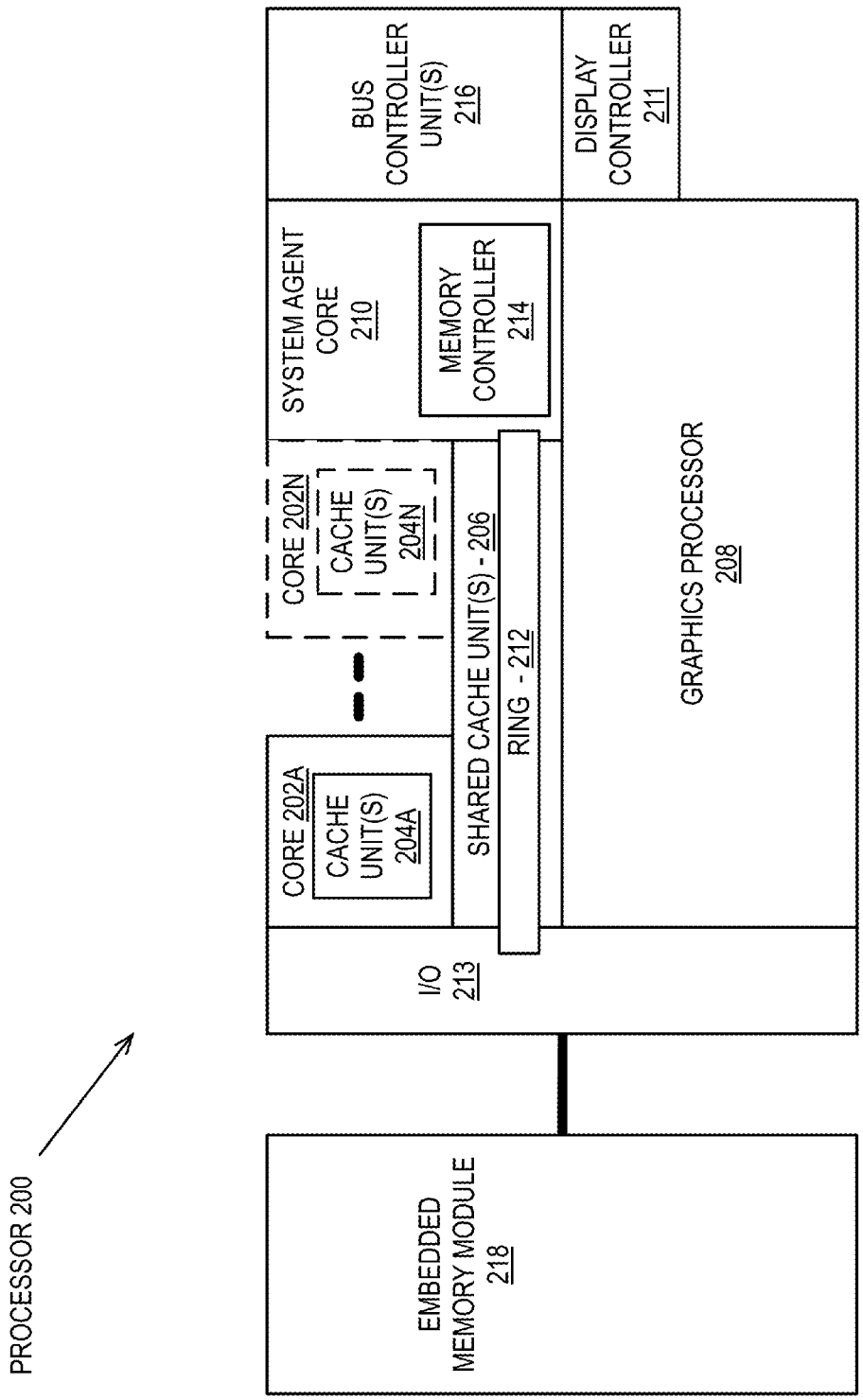
FIG. 2 is a block diagram of one embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202A-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-202N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
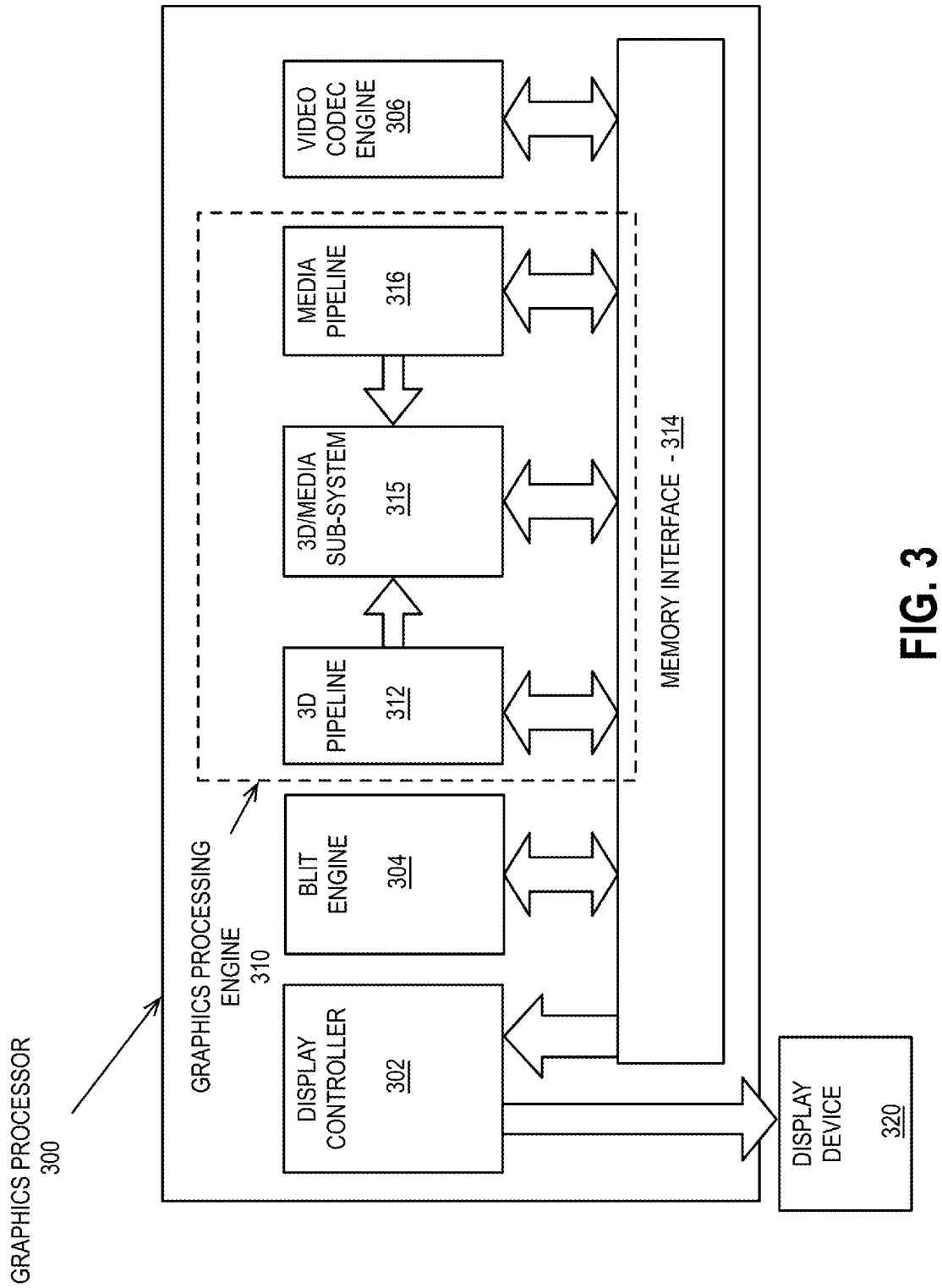
FIG. 3 is a block diagram of one embodiment of a graphics processor which may be a discreet graphics processing unit, or may be graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421 M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, GPE 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

Graphics Processing Engine

Figure 4:
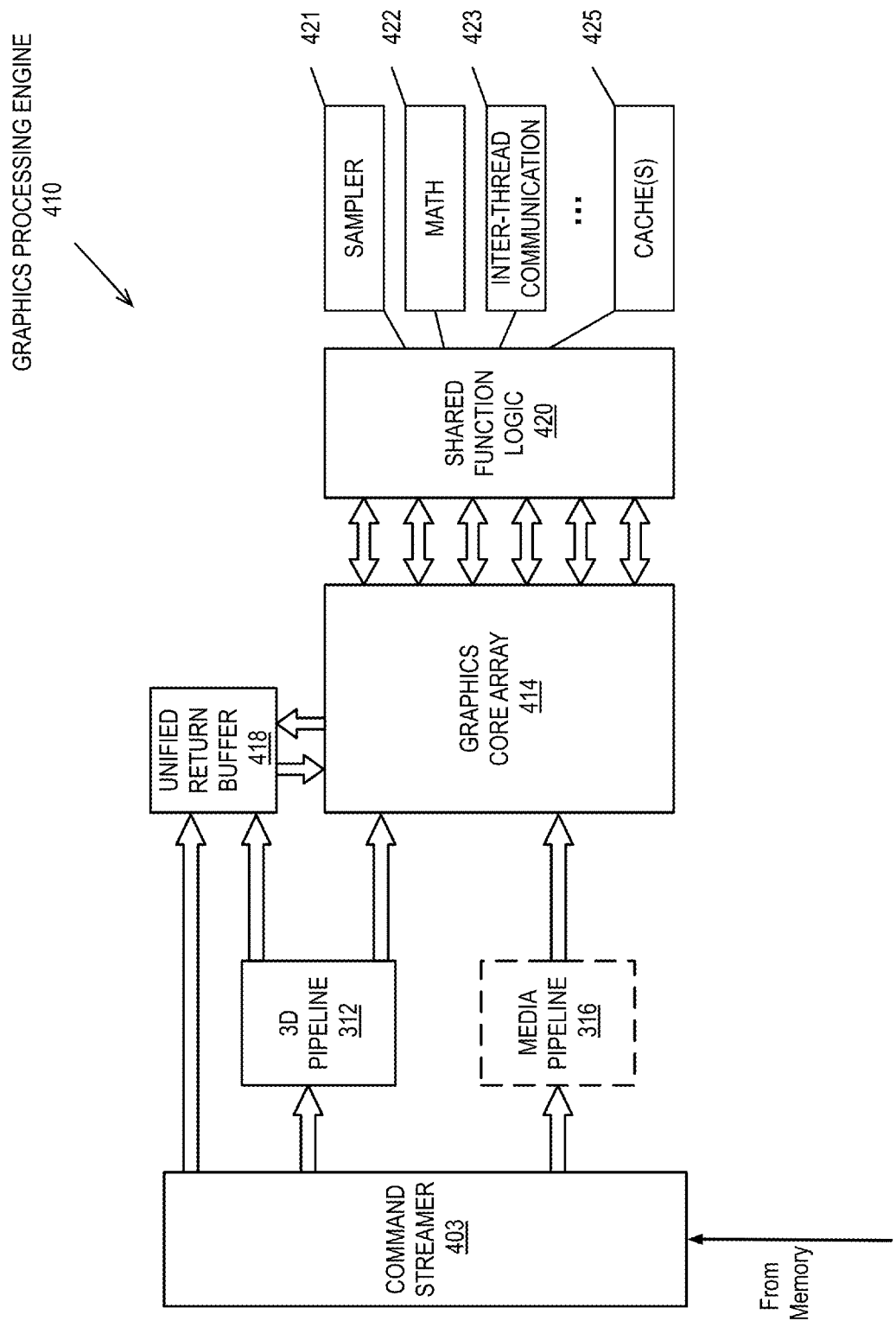
FIG. 4 is a block diagram of an embodiment of a graphics-processing engine for a graphics processor.

FIG. 4 is a block diagram of a graphics processing engine 410 of a graphics processor in accordance with some embodiments. In one embodiment, the graphics processing engine (GPE) 410 is a version of the GPE 310 shown in FIG. 3. Elements of FIG. 4 having the same reference numbers (or names) as the elements of any other figure herein can operate or function in any manner similar to that described elsewhere herein, but are not limited to such. For example, the 3D pipeline 312 and media pipeline 316 of FIG. 3 are illustrated. The media pipeline 316 is optional in some embodiments of the GPE 410 and may not be explicitly included within the GPE 410. For example and in at least one embodiment, a separate media and/or image processor is coupled to the GPE 410.

In some embodiments, GPE 410 couples with or includes a command streamer 403, which provides a command stream to the 3D pipeline 312 and/or media pipelines 316. In some embodiments, command streamer 403 is coupled with memory, which can be system memory, or one or more of internal cache memory and shared cache memory. In some embodiments, command streamer 403 receives commands from the memory and sends the commands to 3D pipeline 312 and/or media pipeline 316. The commands are directives fetched from a ring buffer, which stores commands for the 3D pipeline 312 and media pipeline 316. In one embodiment, the ring buffer can additionally include batch command buffers storing batches of multiple commands. The commands for the 3D pipeline 312 can also include references to data stored in memory, such as but not limited to vertex and geometry data for the 3D pipeline 312 and/or image data and memory objects for the media pipeline 316. The 3D pipeline 312 and media pipeline 316 process the commands and data by performing operations via logic within the respective pipelines or by dispatching one or more execution threads to a graphics core array 414.

In various embodiments the 3D pipeline 312 can execute one or more shader programs, such as vertex shaders, geometry shaders, pixel shaders, fragment shaders, compute shaders, or other shader programs, by processing the instructions and dispatching execution threads to the graphics core array 414. The graphics core array 414 provides a unified block of execution resources. Multi-purpose execution logic (e.g., execution units) within the graphic core array 414 includes support for various 3D API shader languages and can execute multiple simultaneous execution threads associated with multiple shaders.

In some embodiments the graphics core array 414 also includes execution logic to perform media functions, such as video and/or image processing. In one embodiment, the execution units additionally include general-purpose logic that is programmable to perform parallel general purpose computational operations, in addition to graphics processing operations. The general purpose logic can perform processing operations in parallel or in conjunction with general purpose logic within the processor core(s) 107 of FIG. 1 or core 202A-202N as in FIG. 2.

Output data generated by threads executing on the graphics core array 414 can output data to memory in a unified return buffer (URB) 418. The URB 418 can store data for multiple threads. In some embodiments the URB 418 may be used to send data between different threads executing on the graphics core array 414. In some embodiments the URB 418 may additionally be used for synchronization between threads on the graphics core array and fixed function logic within the shared function logic 420.

In some embodiments, graphics core array 414 is scalable, such that the array includes a variable number of graphics cores, each having a variable number of execution units based on the target power and performance level of GPE 410. In one embodiment the execution resources are dynamically scalable, such that execution resources may be enabled or disabled as needed.

The graphics core array 414 couples with shared function logic 420 that includes multiple resources that are shared between the graphics cores in the graphics core array. The shared functions within the shared function logic 420 are hardware logic units that provide specialized supplemental functionality to the graphics core array 414. In various embodiments, shared function logic 420 includes but is not limited to sampler 421, math 422, and inter-thread communication (ITC) 423 logic. Additionally, some embodiments implement one or more cache(s) 425 within the shared function logic 420. A shared function is implemented where the demand for a given specialized function is insufficient for inclusion within the graphics core array 414. Instead a single instantiation of that specialized function is implemented as a stand-alone entity in the shared function logic 420 and shared among the execution resources within the graphics core array 414. The precise set of functions that are shared between the graphics core array 414 and included within the graphics core array 414 varies between embodiments.

Figure 5:
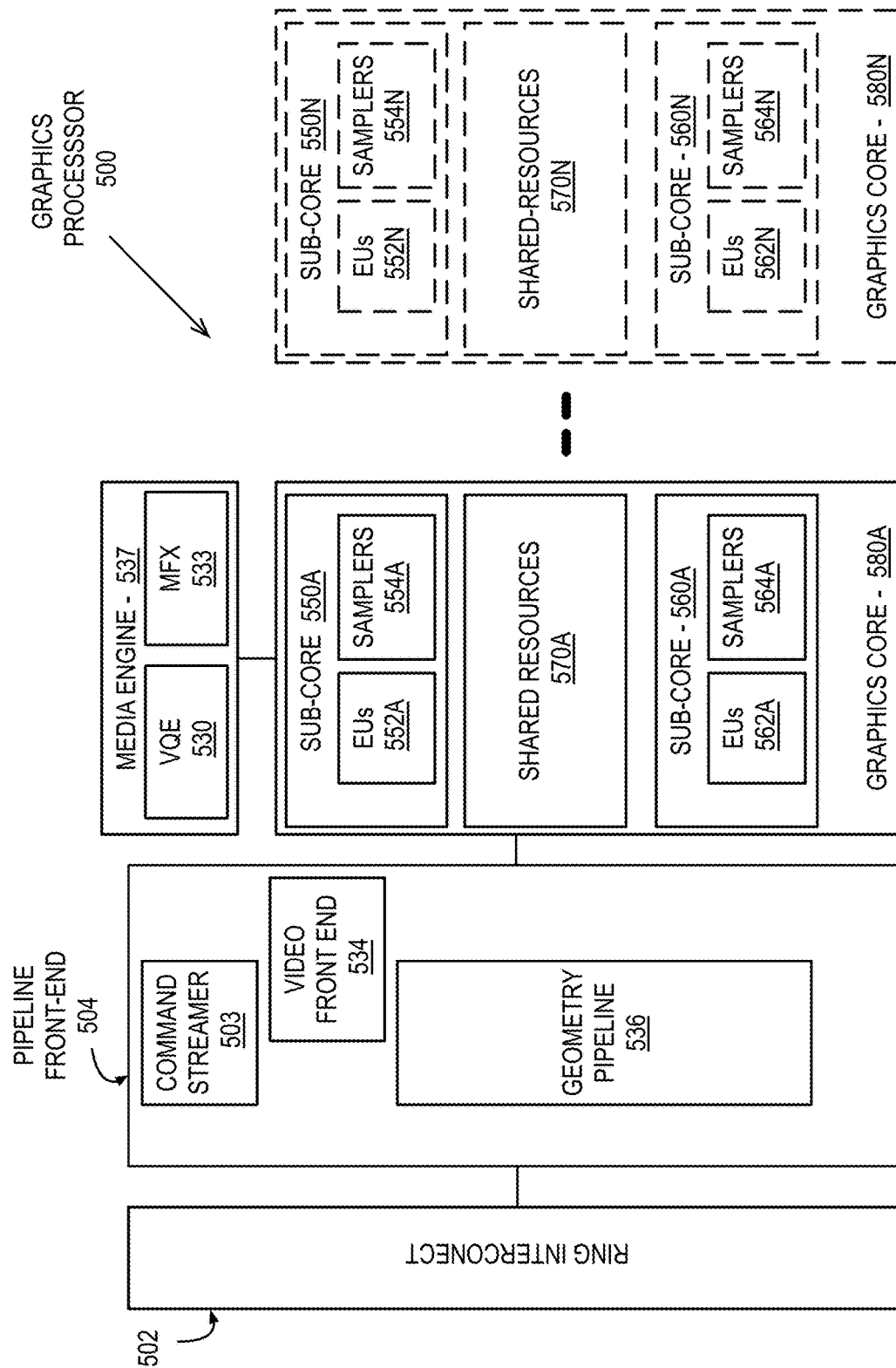
FIG. 5 is a block diagram of another embodiment of a graphics processor.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Execution Units

Figure 6:
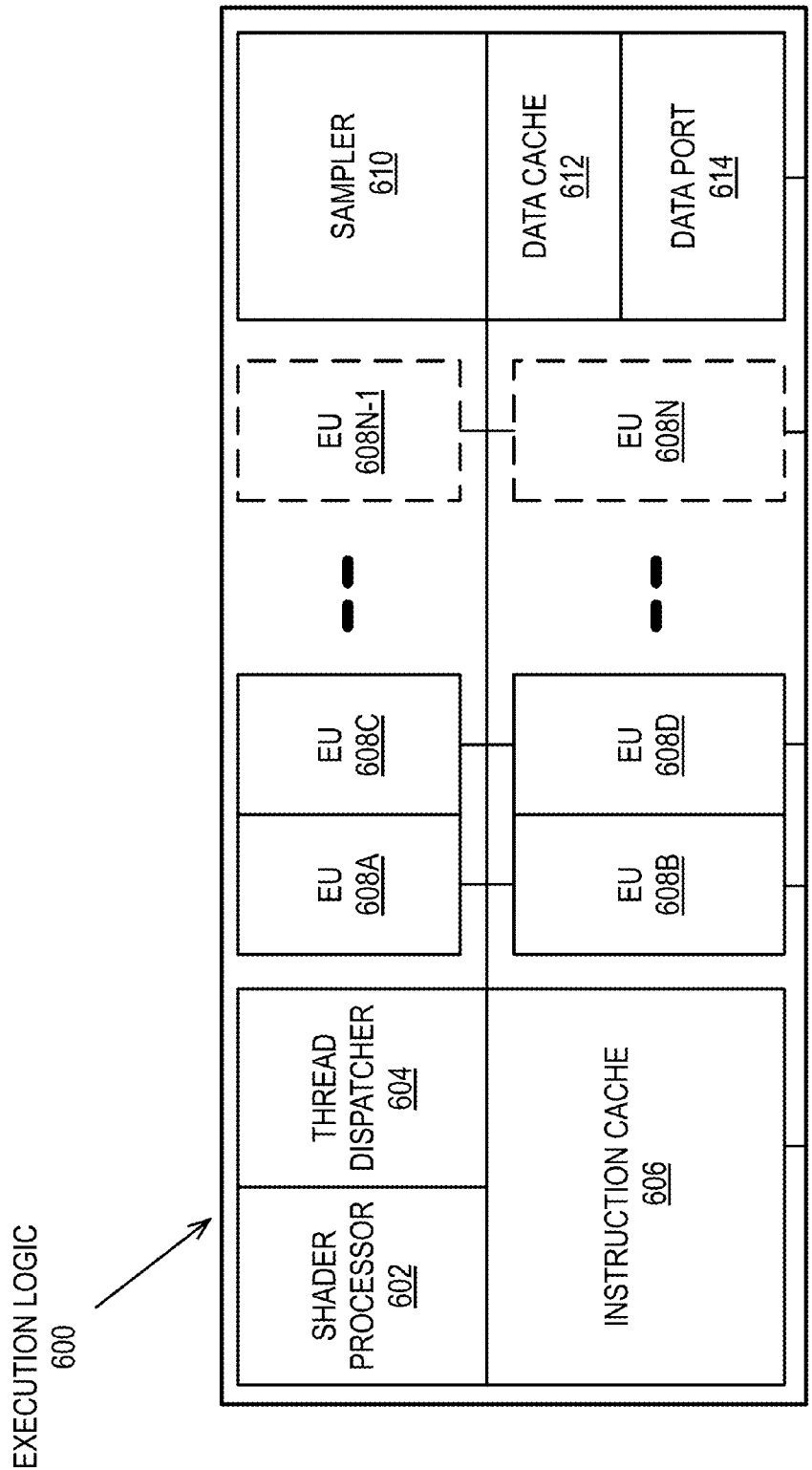
FIG. 6 is a block diagram of thread execution logic including an array of processing elements.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a shader processor 602, a thread dispatcher 604, instruction cache 606, a scalable execution unit array including a plurality of execution units 608A-608N, a sampler 610, a data cache 612, and a data port 614. In one embodiment the scalable execution unit array can dynamically scale by enabling or disabling one or more execution units (e.g., any of execution unit 608A, 608B, 608C, 608D, through 608N-1 and 608N) based on the computational requirements of a workload. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution units 608A-608N. In some embodiments, each execution unit (e.g. 608A) is a stand-alone programmable general purpose computational unit that is capable of executing multiple simultaneous hardware threads while processing multiple data elements in parallel for each thread. In various embodiments, the array of execution units 608A-608N is scalable to include any number individual execution units.

In some embodiments, the execution units 608A-608N are primarily used to execute shader programs. A shader processor 602 can process the various shader programs and dispatch execution threads associated with the shader programs via a thread dispatcher 604. In one embodiment the thread dispatcher includes logic to arbitrate thread initiation requests from the graphics and media pipelines and instantiate the requested threads on one or more execution unit in the execution units 608A-608N. For example, the geometry pipeline (e.g., 536 of FIG. 5) can dispatch vertex, tessellation, or geometry shaders to the thread execution logic 600 (FIG. 6) for processing. In some embodiments, thread dispatcher 604 can also process runtime thread spawning requests from the executing shader programs.

In some embodiments, the execution units 608A-608N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 608A-608N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 608A-608N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader.

Each execution unit in execution units 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, a sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. Once a group of geometric objects has been processed and rasterized into pixel data, pixel processor logic (e.g., pixel shader logic, fragment shader logic, etc.) within the shader processor 602 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 602 then executes an application programming interface (API)-supplied pixel or fragment shader program. To execute the shader program, the shader processor 602 dispatches threads to an execution unit (e.g., 608A) via thread dispatcher 604. In some embodiments, pixel shader 602 uses texture sampling logic in the sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 710. A 64-bit compacted instruction format 730 is available for some instructions based on the selected instruction, instruction options, and number of operands. The native 128-bit instruction format 710 provides access to all instruction options, while some options and operations are restricted in the 64-bit instruction format 730. The native instructions available in the 64-bit instruction format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit instruction format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For instructions in the 128-bit instruction format 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode field 726 specifying, for example, whether direct register addressing mode or indirect register addressing mode is used. When direct register addressing mode is used, the register address of one or more operands is directly provided by bits in the instruction.

In some embodiments, the 128-bit instruction format 710 includes an access/address mode field 726, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 726 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
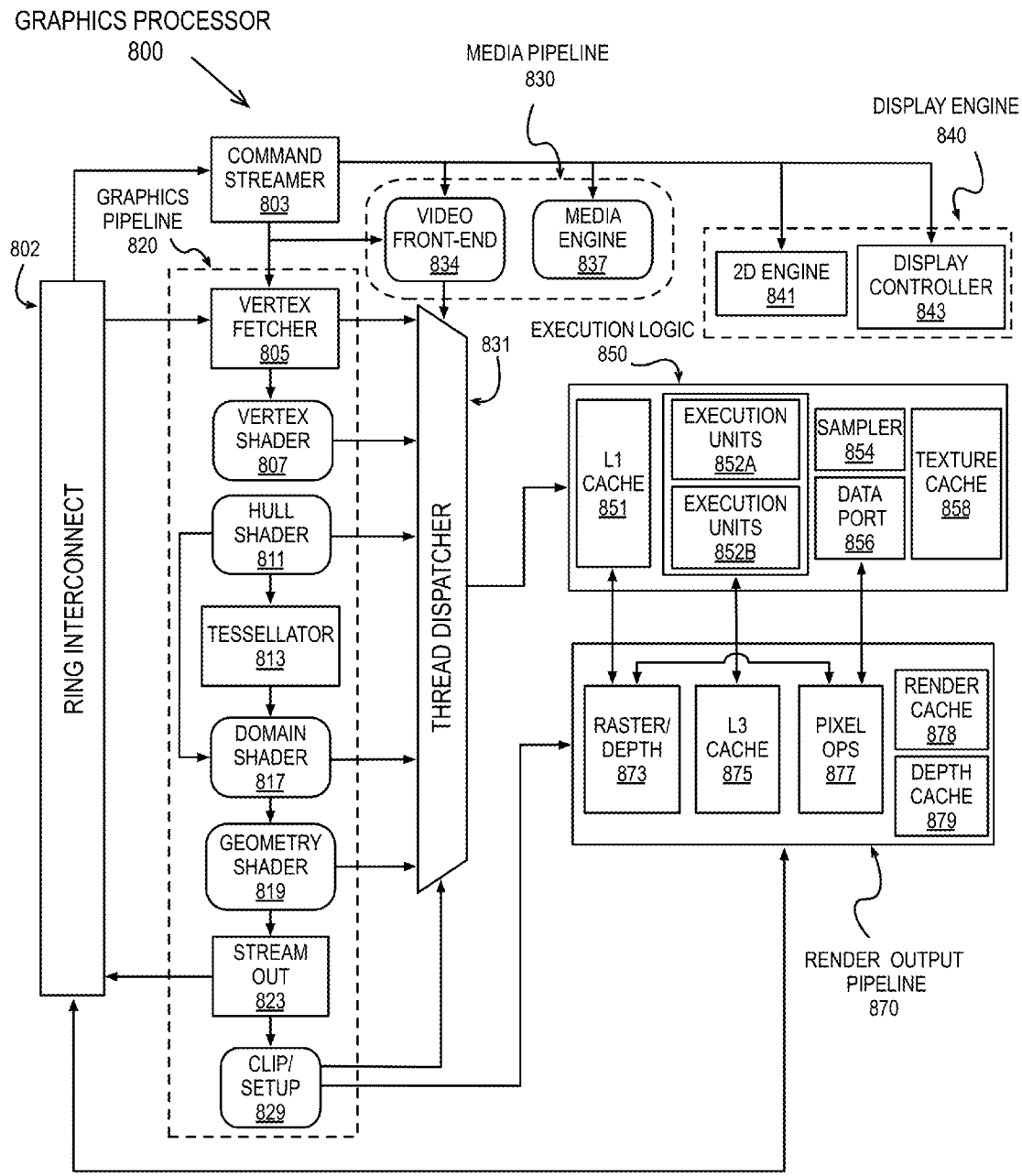
FIG. 8 is a block diagram of another embodiment of a graphics processor which includes a graphics pipeline, a media pipeline, a display engine, thread execution logic, and a render output pipeline.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A-852B via a thread dispatcher 831.

In some embodiments, execution units 852A-852B are an array of vector processors having an instruction set for performing graphics and media operations. In some embodiments, execution units 852A-852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components (e.g., hull shader 811, tessellator 813, and domain shader 817) can be bypassed.

In some embodiments, complete geometric objects can be processed by a geometry shader 819 via one or more threads dispatched to execution units 852A-852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into their per pixel representations. In some embodiments, pixel shader logic is included in thread execution logic 850. In some embodiments, an application can bypass the rasterizer and depth test component 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A-852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A-852B each have separate memory access paths.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, commands for the return buffer state 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, configuring the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930 or the media pipeline 924 beginning at the media pipeline state 940.

The commands to configure the 3D pipeline state 930 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of commands to configure the media pipeline state 940 are dispatched or placed into a command queue before the media object commands 942. In some embodiments, commands for the media pipeline state 940 include data to configure the media pipeline elements that will be used to process the media objects. This includes data to configure the video decode and video encode logic within the media pipeline, such as encode or decode format. In some embodiments, commands for the media pipeline state 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
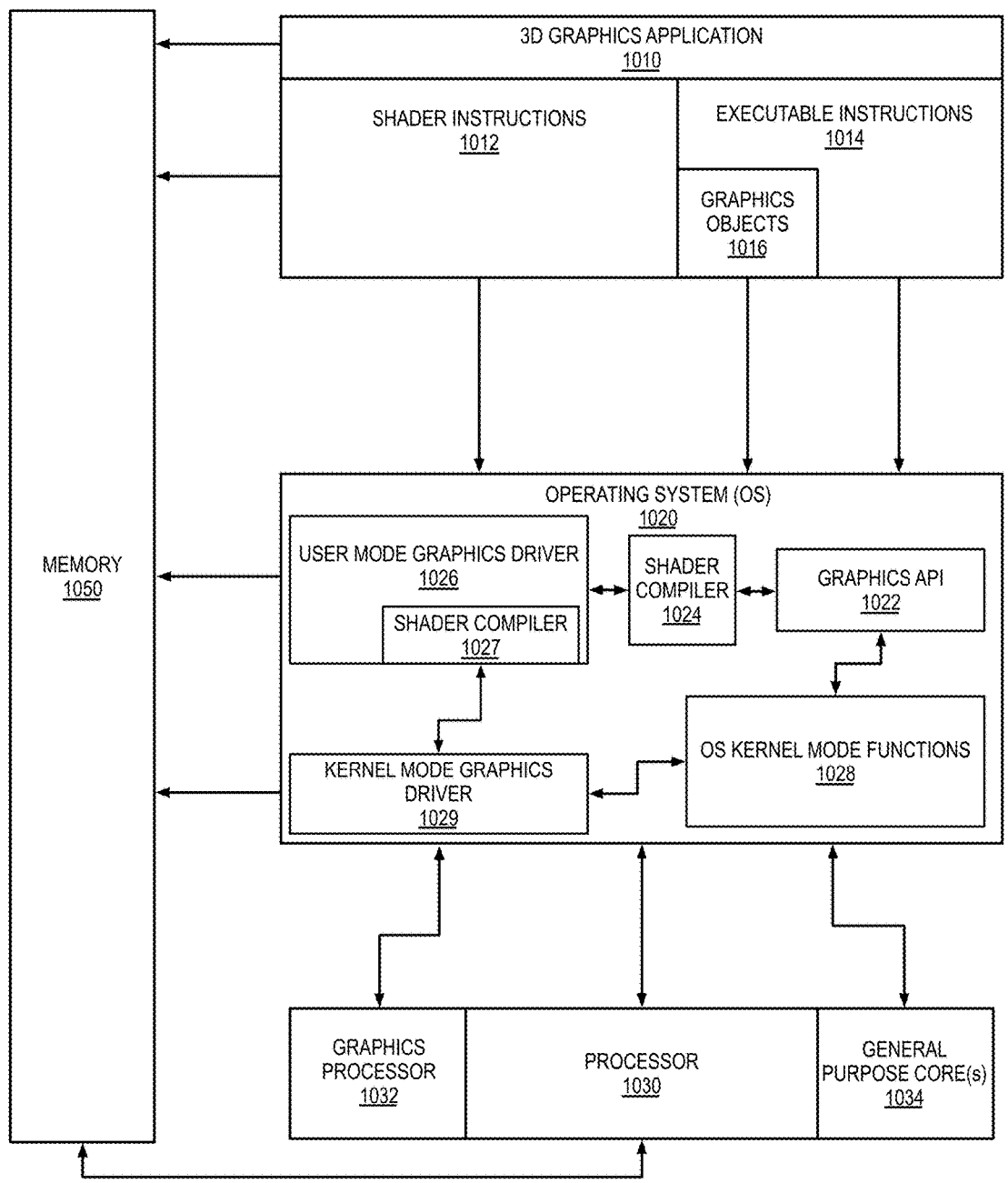
FIG. 10 illustrates exemplary graphics software architecture for a data processing system according to an embodiment.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API, the OpenGL API, or the Vulkan API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010. In some embodiments, the shader instructions 1012 are provided in an intermediate form, such as a version of the Standard Portable Intermediate Representation (SPIR) used by the Vulkan API.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11:
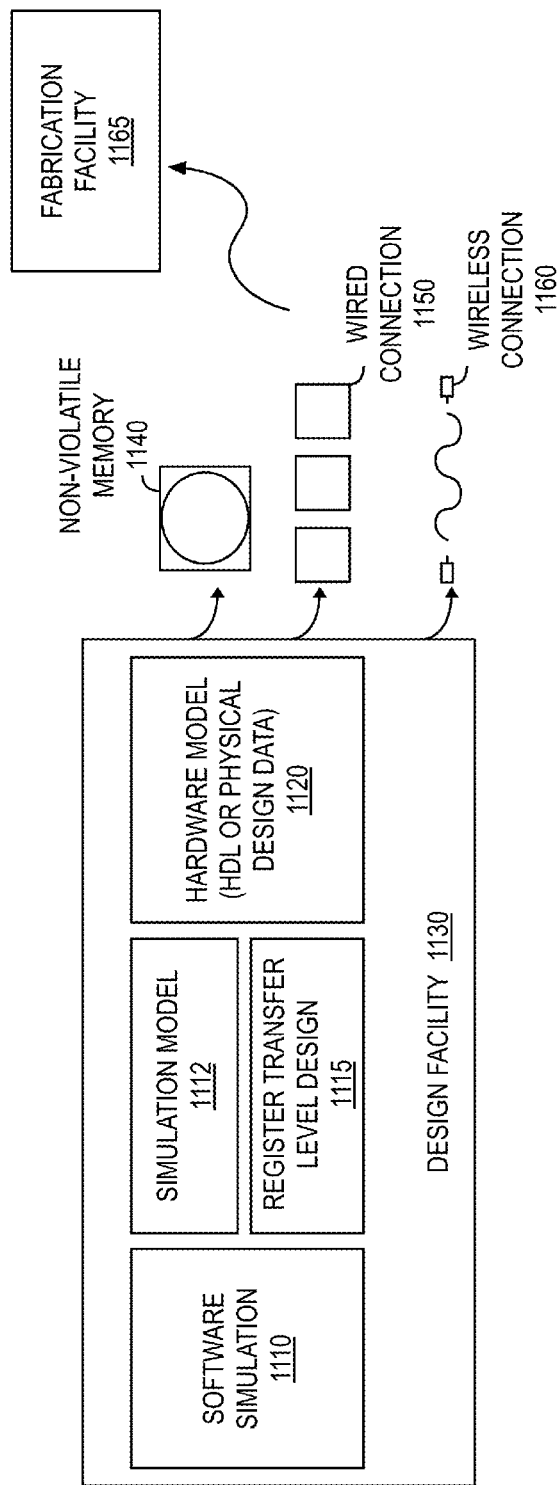
FIG. 11 illustrates an exemplary IP core development system that may be used to manufacture an integrated circuit to perform operations according to an embodiment.

FIG. 11 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design 1115 can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a 3rd party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Exemplary System on a Chip Integrated Circuit

Figure 12:
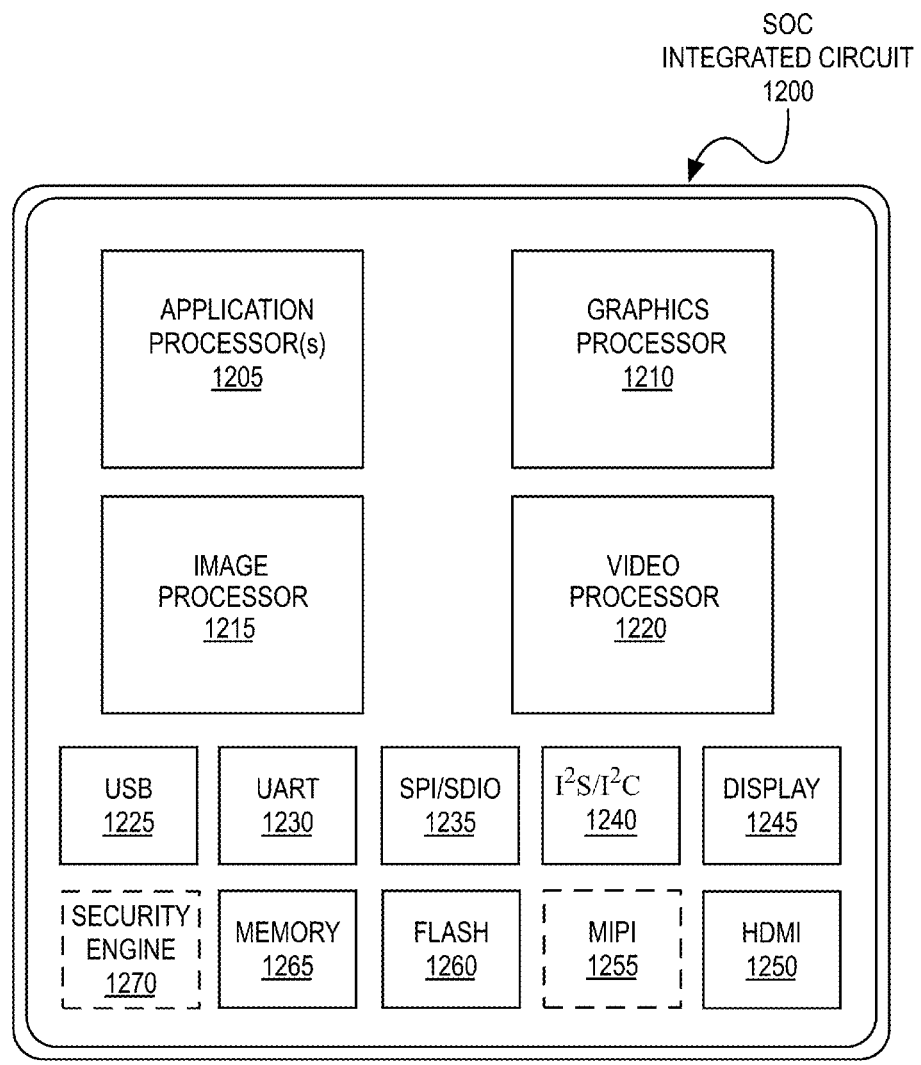
FIG. 12 illustrates an exemplary system on a chip integrated circuit that may be fabricated using one or more IP cores, according to an embodiment.
Figure 13:
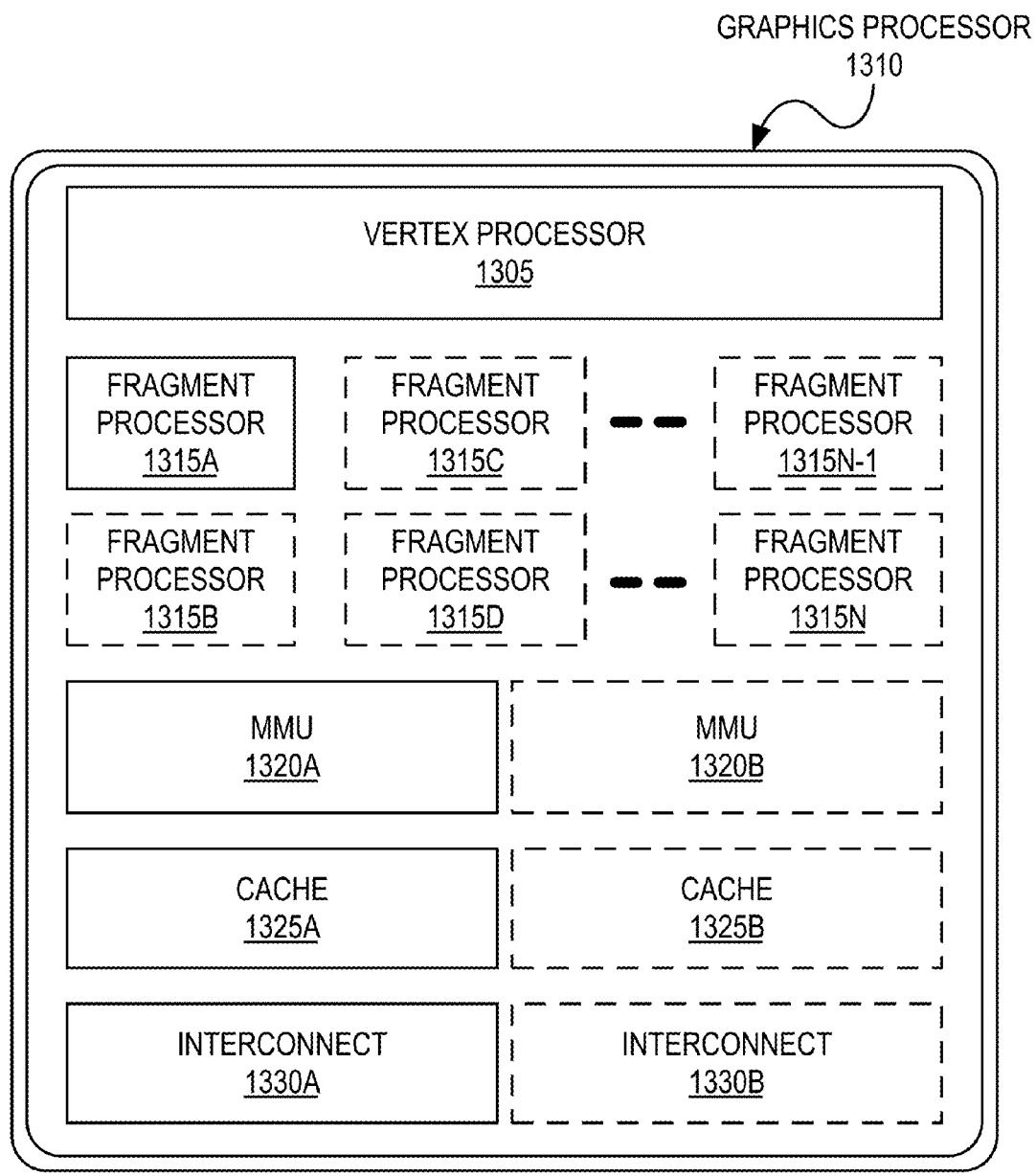
FIG. 13 illustrates an exemplary graphics processor of a system on a chip integrated circuit that may be fabricated using one or more IP cores.
Figure 14:
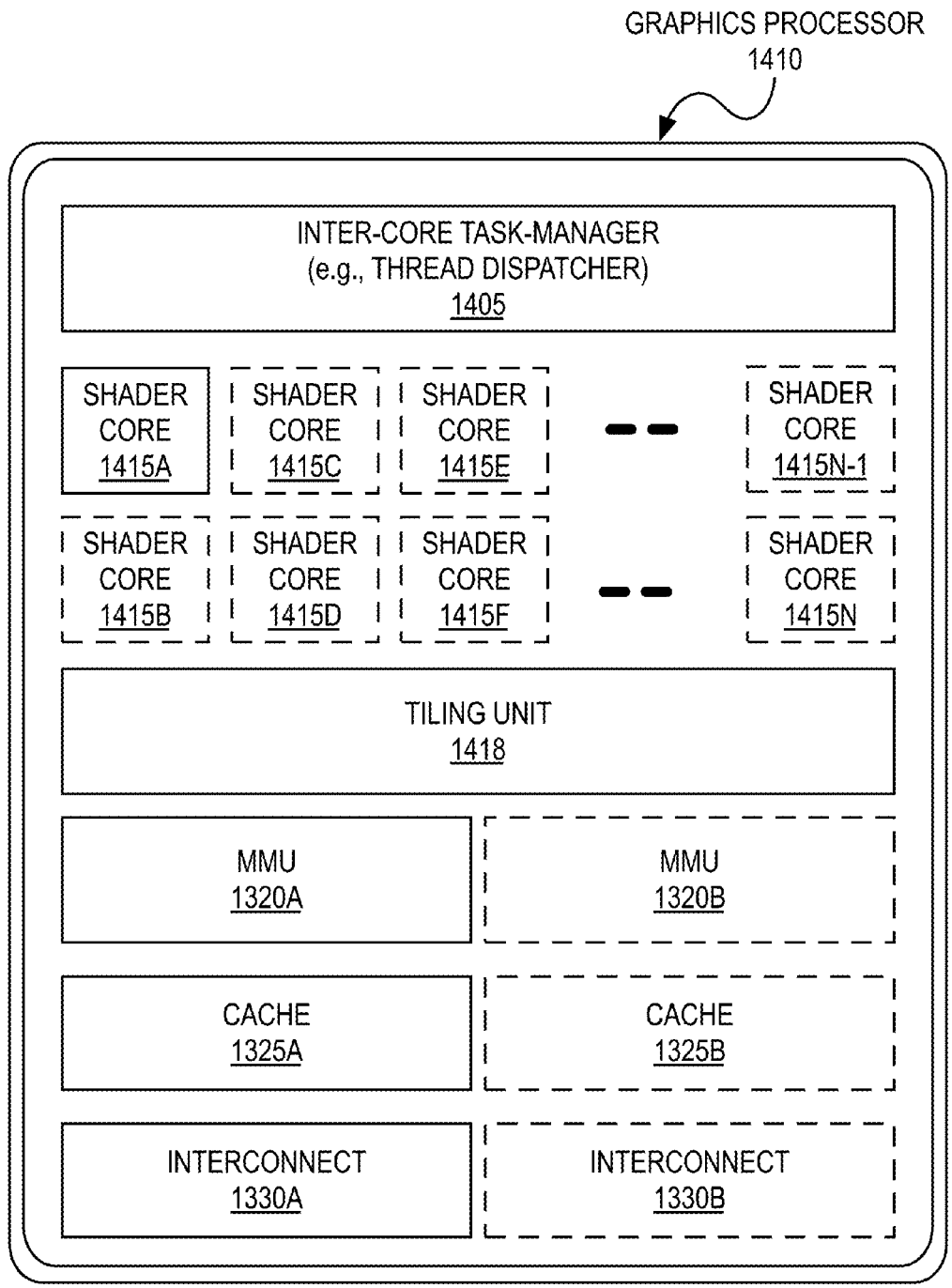
FIG. 14 illustrates an additional exemplary graphics processor of a system on a chip integrated circuit that may be fabricated using one or more IP cores.

FIGS. 12-14 illustrate exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general purpose processor cores.

FIG. 12 is a block diagram illustrating an exemplary system on a chip integrated circuit 1200 that may be fabricated using one or more IP cores, according to an embodiment. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an I2S/I2C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

FIG. 13 is a block diagram illustrating an exemplary graphics processor 1310 of a system on a chip integrated circuit that may be fabricated using one or more IP cores, according to an embodiment. Graphics processor 1310 can be a variant of the graphics processor 1210 of FIG. 12. Graphics processor 1310 includes a vertex processor 1305 and one or more fragment processor(s) 1315A1315N (e.g., 1315A, 1315B, 1315C, 1315D, through 1315N-1, and 1315N). Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a framebuffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for graphics processor 1310, including for the vertex processor 1305 and/or fragment processor(s) 1315A-1315N, which may reference vertex or image/texture data stored in memory, in addition to vertex or image/texture data stored in the one or more cache(s) 1325A-1325B. In one embodiment the one or more MMU(s) 1320A-1320B may be synchronized with other MMUs within the system, including one or more MMUs associated with the one or more application processor(s) 1205, image processor 1215, and/or video processor 1220 of FIG. 12, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

FIG. 14 is a block diagram illustrating an additional exemplary graphics processor 1410 of a system on a chip integrated circuit that may be fabricated using one or more IP cores, according to an embodiment. Graphics processor 1410 can be a variant of the graphics processor 1210 of FIG. 12. Graphics processor 1410 includes the one or more MMU(s) 1320A-1320B, cache(s) 1325A-1325B, and circuit interconnect(s) 1330A-1330B of the integrated circuit 1300 of FIG. 13.

Graphics processor 1410 includes one or more shader core(s) 1415A-1415N (e.g., 1415A, 1415B, 1415C, 1415D, 1415E, 1415F, through 1315N-1, and 1315N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 1410 includes an inter-core task manager 1405, which acts as a thread dispatcher to dispatch execution threads to one or more shader core(s) 1415A-1415N and a tiling unit 1418 to accelerate tiling operations for tile-based rendering, in which rendering operations for a scene are subdivided in image space, for example to exploit local spatial coherence within a scene or to optimize use of internal caches.

Method and Apparatus for Efficient Use of Graphics Processing Resources in a Virtualized Execution Environment Virtual machines (VMs) running on a physical host may use one or more graphics processing units (GPUs) to perform graphics operations. Hypervisor software manages how the GPU can be used by the VMs. Each VM runs a guest operating system, which may be a desktop, laptop or tablet operating system like Linux, Microsoft Windows, or Android. Devices from the host physical machine can be presented to a VM as virtual devices under the management software within the host. Some of the devices assigned or placed within the VM OS environment are built into the motherboard (e.g., the keyboard, serial ports) but other devices reside on the peripheral component interconnect (PCI) bus. The PCI bus architecture is presented to the VM OS using a virtual PCI (VPCI) abstraction layer.

The GPU on the host PCI bus can be directly assigned to one VM and used only by that VM. This is Direct Device Assignment (DDA) for the host GPU. The host GPU can be a multiple GPU sub-system with the ability to assign each separate GPU to a VM for exclusive use by that VM in a fashion similar to DDA. For a single root input/output virtualization (SR-IOV) device, the host GPU can be partitioned and assigned to separate VMs using the bus protocol. There are physical functions (PFs) and virtual functions (VFs). The PF is single instantiated in the host runtime and each VF is used by the guest OS. The guest OS views a GPU that is partitioned with less resources then the whole. For example, a GPU with 1024 execution units (EUs) may be assigned to 8 guests where each guest can use 128 EUs. In this environment fixed sized memory like that on a discreet GPU is often split among the VMs using it. Another example is a GPU with 8 GB of memory where each of the GPUs is assigned to 8 guests then each guest uses 1 GB of memory. The system or GPU resources are exposed using the SR-IOV specification and managed by the Hypervisor system software.

Modern GPUs can context switch from one logical state to anther logical state quickly. This is a requirement of a modern GPU due to the multi-threaded nature of rendering environments. GPUs use direct memory access (DMA) to get command data from system memory or dedicated memory on the adapter. The command data or stream consists comes in three types: meta-data, memory context commands and commands specific to the type of engine. The meta-data commands set registers, program power management state, perform jump and return commands or other privileged commands. Memory context commands set the base memory pointer to the entire GPU or for just the engine context. The commands in a command buffer are engine-specific. These are commands sent to the 3D rendering engine, video decode, video encode, display engine, bit block transfer (BLIT) engine, or other application specific engine. Almost all commands in command buffers can be executed by any GPU after a memory context switch followed by an engine context switch. This means that command buffers can be processed by any GPU from any VM. Out-of-order rendering is enabled in modern GPUs but for some operations ordered rendering is very important. An example is blending with transparency. The render target memory and rendering state can be switched easily with a very small number of writes to the GPU context registers. The context switch does take time and it flushes internal GPU caches but the time taken is usually on the order of milliseconds. The context switch of the memory state is usually heavy weight. However the engine switch of context is usually light weight because it takes less time and it can be pipelined.

GPUs may be used by application software to perform specific tasks which fall into several categories that are relevant to the embodiments of invention. Applications or window system interfaces draw 3D scenes, block image transfer (BLIT) pixel data, decode or encode video streams, and manage output to the display. Applications use application programming interfaces (APIs) to access GPU resources and render to the destination surface. The destination for rendering commands can be a render target or a display depending on the desired results. Examples of 3D APIs are OpenGL and DirectX. The layering of the software calls through the device driver interface (DDI) into the KMD. The KMD manages system resources for the GPU hardware and prepares the GPU for the application workload. The GPU accepts many different resources including shaders (microcode written specific to the GPU), surface data (textures, depth/stencil, and render targets), buffers (vertex buffers, index buffer, control points), control commands that read/write data for the GPU processors, and many other sources of data.

System software in a computer can manage the GPU hardware in several ways. The GPU power consumption can be controlled through system software. The system software is implemented in the system basic input/output software (BIOS) or advanced configuration and power interface (ACPI). There are PCI registers to control the power of a GPU. When the GPU is used in a hypervisor environment, the power management is completely controlled by the hypervisor. The guest does not have any control of power management. The GPU can be completely shut down or parts of the internal hardware can be shutdown using less power.

In one embodiment of the invention, one or more GPUs generate performance data comprised of nanosecond timers and engine counters implemented within the GPU hardware. Timing for each part of the GPU engine is available to system software and application software. The performance data generated within the GPU is written into shared memory using DMA or bus write commands. The shared memory is available to applications through page mapping in the OS. In the hypervisor environment shared memory is available to the guest OS as well as the host system software. The GPU scheduler or KMD generates a header and trailer for each command buffer before giving it the GPU. The header and trailer write performance data per GPU and per VM. This allows hypervisor host software to manage the performance of each VM per command buffer.

In current DDA and SR-IOV implementations there is no para-virtualization and the drivers work as if they were running in a native machine. If one guest underutilized the GPU resources then those resources are wasted and if a guest driver runs out of resources then the guest must invoke often complex algorithms to manage the limited resources. There is no load balancing or any other technique for managing multiple GPUs. Since each guest is isolated from the others, there is no global management of power, performance or even an attempt at efficient use of GPU resources. DDA, SR-IOV and direct assignment are all fixed allocation models either at the GPU compute level or at the GPU memory level.

In the VM server environment there are additional problems that cannot be solved with DDA or SR-IOV. The first is resource load balancing. The second is display output when several VMs are all generating display output commands; it is difficult or even impossible to predict when VM "owns" the one display connected to the server. In reality, there is often no display on the server so the difficult task of deciding how to manage the display output from potentially hundreds of VMs running graphics software. Most likely the display output from all VMs goes to different remote viewing applications. The Hypervisor system software can and must make the decision about the final TCP/IP address of the display commands. The decision cannot be left up to a VM that is isolated and unaware that it is running on a server with hundreds of VMs.

Figure 15:
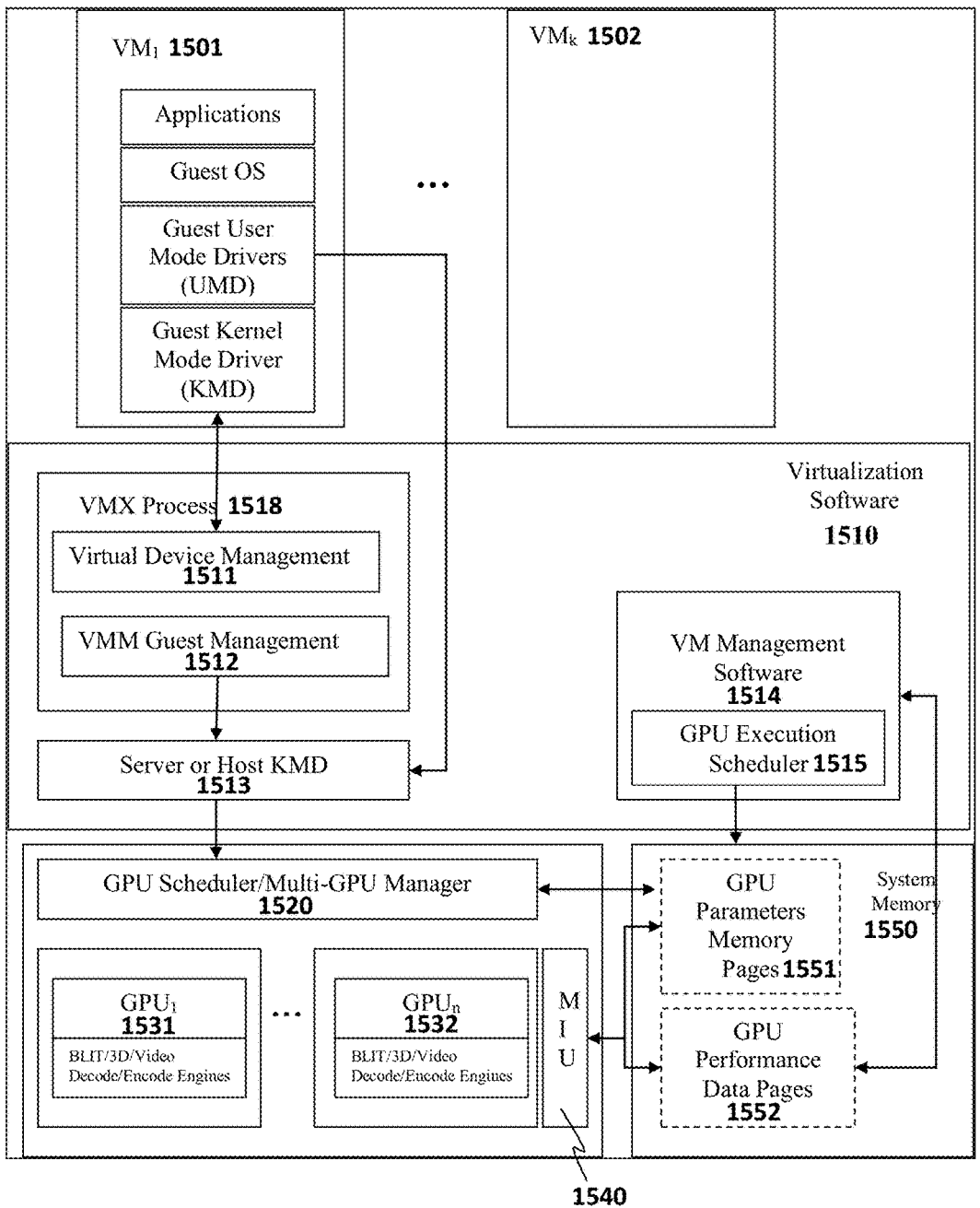
FIG. 15 illustrates a virtualized graphics processing system on which embodiments of the invention may be implemented.

As illustrated in FIG. 15, in one embodiment, multiple GPUs 1531-1532 in the host physical machine are efficiently shared between VMs 1501-1502 using a virtualization software 1510 (sometimes referred to as "hypervisor 1510"). The virtualization software 1510 may be provided with control over the manner in which GPU resources are shared through memory 1550 with a GPU scheduler/Multi-GPU Manager 1520 (hereinafter "GPU scheduler 1520") or a server/host kernel mode driver (KMD) 1513 controlling the multiple GPUs 1531-1532. Graphics microcode (GuC) may be used to implement the GPU scheduler 1520 in one embodiment. In one embodiment, load balancing in either graphics microcode or in the KMD may be used to distribute the workload on the multiple GPU subsystem. Software in control of the hypervisor 1510 or the host system software can be used to determine how the multiple GPU subsystem is used. In one embodiment, the control of the behavior of the GPU scheduler or KMD software is contained within one or more memory pages 1551-1552 shared between the server user mode components and the kernel components.

In one embodiment, the hypervisor 1510 reads performance data from GPU performance data pages 1552 (provided by GPUs 1531-1532 via memory interface unit (MIU) 1540) and uses this data to tune the parameters controlling the load balancing algorithms as described herein. In one embodiment, the entire GPU resources for a particular GPU can be assigned to a specific VM (e.g., GPU 1531 may be fully assigned to VM 1501). There may be no fixed allocations of GPU resources because the GPU scheduler or KMD host software determines the GPU resources dynamically as needed. In one embodiment, GPU memory 1550 is allocated and managed completely by the host software and mapped into the guest environment as needed using host-based memory management software.

In one embodiment, each VM 1501-1502 generates command buffers that the GPU scheduler 1520 or host KMD 1513 manage in a simple queuing model. As each command buffer is sent to a specific GPU 1520, header information including performance commands are added if capturing performance data is enabled. Power management of each GPU may also be enabled through the shared memory page 1551.

Virtual machines 1501-1502 are abstracted by the virtualization software 1510 running on a physical machine which may include a host system memory 1550, multiple CPUs (not shown) and multiple GPUs 1531-1531. In one embodiment, the virtualization software 1510 includes memory management software 1514, virtual motherboard software (not shown), virtual device software, virtual PCI bus software, VMX processes 1518 that manage virtual machine resources, and host KMDs 1513. The VMX process 1518 includes a VMM guest management component 1512 to manage all guest resources including exposing a virtual GPU (VGPU) to the guest OS and a virtual device management component 1511 for managing virtual devices (e.g., VGPUs). In one embodiment, each guest/VM 1501-1502 that connects to a VMX process 1518 receives a unique system-wide ID. The guest/VM enumerates the devices to find the VGPU and loads VGPU drivers just as a native system would. As illustrated, a guest may include application software, a graphics API software and kernel mode drivers (KMDs). One of the kernel mode drivers in the guest/VM 1501 manages the VGPU resources and activity. The guest VGPU drivers can be para-virtualized to communicate with the host VMX process 1518.

Virtualization software 1510 in the server or host initializes the host GPU drivers which, in one embodiment, are split between driver components in the VMX processes 1518 and in host KMD 1513. In one embodiment, there is a negotiation of resources including host memory 1550 that each host GPU can use. Shared memory 1550 is allocated for the purpose of managing parameters to the KMD or GPU scheduler. Host hypervisor management software 1514 can access this memory 1550. Hypervisor software in a command shell or GUI interfaces with the hypervisor management software 1514 to write values into shared pages which includes GPU parameters memory pages (GPMP) 1551. In the illustrated embodiment, a GPU execution scheduler 1515 of the management software 1514 writes the values to the GPMP 1551. In one embodiment, the GPU parameters are used to communicate with the KMD and GPU scheduler specific runtime options (described in greater detail below).

Figure 16:
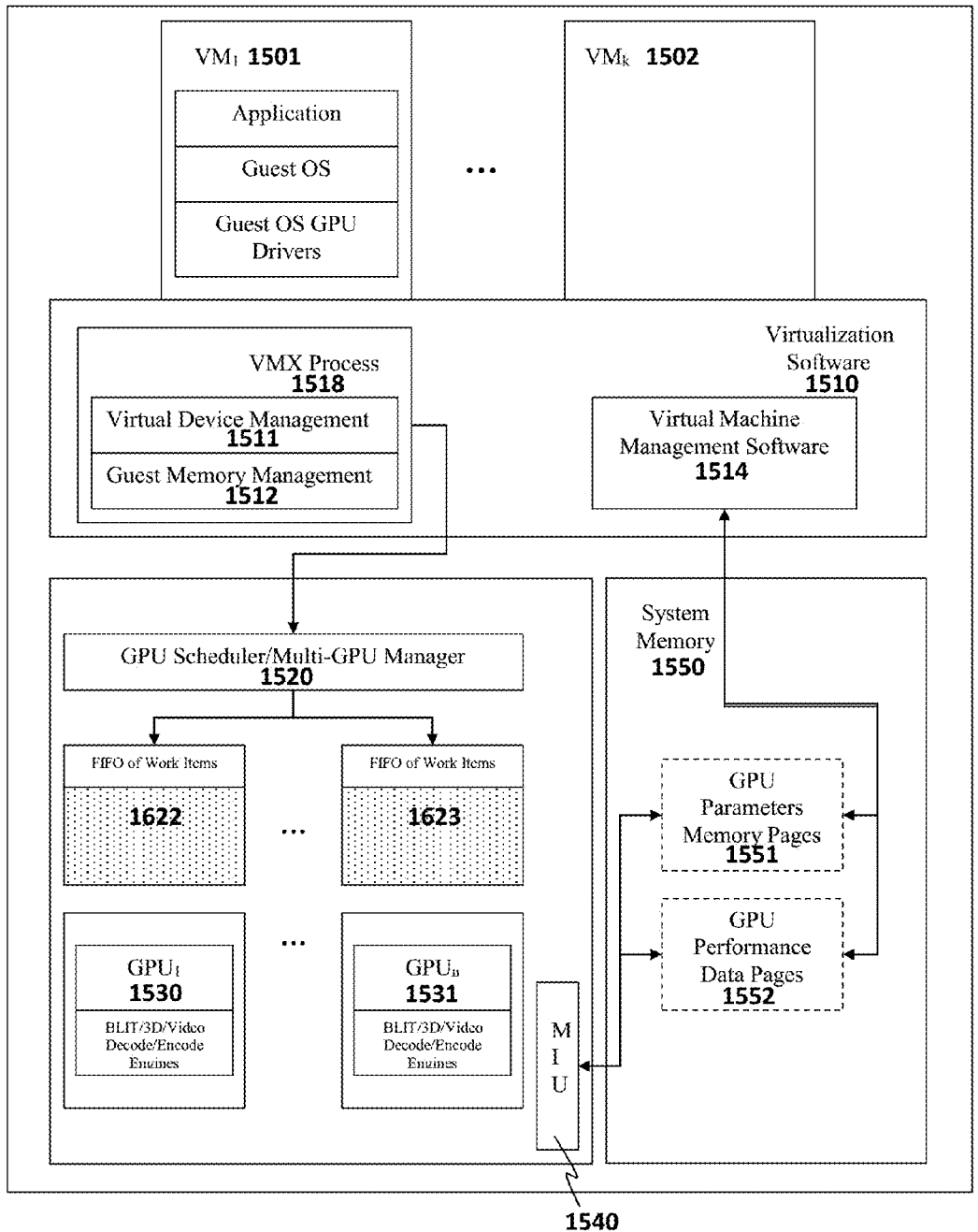
FIG. 16 illustrates additional details of the virtualized graphics processing system including first-in-first-out buffers for queuing work items.

In one embodiment, guest software including applications use an application programming interface (API) such as DirectX, OpenGL or DXVA to build graphics command buffers (e.g., built in the guest UMD or guest KMD) which are specific to the GPU architecture exposed to the guest OS by the VMX process 1518. The command buffers are submitted to the host GPU through a process of writing into guest memory. The write into guest memory either wakes up a thread running in the VMX software stack or in the host KMD 1513 or possibly the host GPU scheduler. The thread that wakes up processes the command buffer and submits it to the KMD or GPU scheduler for further processing by a specific GPU or multiple GPUs. The command buffers submitted by the KMD or GPU scheduler contain metadata in the form of a header which may enable performance data 1552 to be written into the shared memory area allocated by the hypervisor host software (e.g., virtualization software 1510). In one embodiment, a GPU scheduler 1520 schedules execution of the command buffers by the GPUs 1531-1532 in accordance with the performance data 1552. In particular, as illustrated in FIG. 16, the GPU scheduler 1520 may generate a FIFO of work items 1622-1623 for each GPU 1530-1531, respectively. Each GPU 1530-1531 will then read commands from its respective FIFO buffer 1622-1623, respectively. A memory interface unit 1540 provides the GPUs with access to the shared system memory 1550. Additional details related to the metadata header and performance data are described below.

In one embodiment, the GPU is initialized by writing memory state or context information to PCI registers (not shown). The PCI registers may be exposed through standard OS PCI bus mechanisms to the guest OS by a virtual PCI (VPCI) module in the VMX process 1518. Thus, GPU initialization sets the GPU memory state or context. It is quick and easy to change the GPU memory context by writing the same PCI registers and using a protocol of writes that is specific to the GPU hardware. In one embodiment, the host KMD 1513 is written to perform this initial setup. Once the basic memory context is setup, GPU hardware can access memory 1550 to read command buffers or read other GPU memory resources and write into GPU memory resources as required by the commands in the command buffer.

In one embodiment, the GPU command buffers reside in system memory 1550 and the GPU memory context is used by the host GPU to gain access to the system memory. There are various different types of commands. The first type involves memory and GPU memory context. This is often a guest physical address (GPA) that points to several pages of guest memory that describes the page tables. The second type of command involves programming metadata in the GPU itself which could be, for example, a command to write a memory-to-memory-input-output (MMIO) register in the PCI BAR address space or some other internal register to the GPU. The third type of command in the command buffer is engine-specific and often involves a translation of API calls. Examples of engine specific commands are set texture handle, draw triangle, decode a macrocode block, encode an image, copy pixel data, update vertex or index buffers, set a shader microcode handle, set blend state, set depth/stencil state, set color format for render target, to name just a few. There are a significant number of execution specific commands which depend on the type of engine. Even though the embodiments of the invention only reference preexisting engine types, there can be a large number of them. The point is that the commands are stored in memory 1550 and that memory is setup and accessed using information from the GPU memory state or the GPU memory context.

The host KMD 1513 or GPU scheduler 1520 receives command buffers from each VMX process 1518 or from the guest OS directly. In one embodiment, the command buffers are tagged with the guest's/VM's 1501 unique ID. This is the basic element used by the virtualization software 1510 and GPU hardware to determine how to send command buffers to any or all GPUs. There are two basic types of command buffers: those that have metadata and those that do not. In the later case, the guest OS may not be aware of the host software requirements because the guest drivers are not using a para-virtualized implementation or the version of the para-virtualization does not match the host runtime. In this case, the host VMX process 1518 can choose between several different actions with respect to the guest OS. It can reject all command buffers and disable the guest or it may not expose the GPU to the guest at all in which case the guest OS will use VESA or VGA mode for the desktop. It is also possible for the VMX process 1518 to use Direct Device Assignment (DDA) for that guest/VM. For the enlightened guest, i.e., the guest that is para-virtualized, the command buffer contains header information that indicates the type of command buffer. The details of the meta-data associated with guest command buffers is discussed in greater detail below.

In one embodiment of the invention, the virtualization software 1510 uses some number of host GPUs 1531-1532 to share with guests and there may be GPUs in the host not shared with any guests. In one embodiment, each host GPU that is shared is assigned its own unique ID. For each host GPU shared, a data structure in the parameters page 1551 is used to setup the GPU state as a shared device. Entries in the parameters page are shared between the virtualization software 1510, the host KMD 1513 and the physical GPU or GuC 1531-1532. The data format and details can be GPU-specific. One exemplary set of parameter data might be: {int enableFeatures; int enablePM; int enablePerformance; int enableSchedulingAlgo; int enableDebugFeatures; uintptr_t baseAddressOfPerformancePage; uint64 offsetIntoPerformancePage; uint64 sizeOfPerformanceBuffer;}.

A privileged command buffer is sent to each GPU shared with the base address of the parameters page 1551 and the offset into the page is specific to that GPU. The GPU hardware 1531-1532 or GPU scheduler reads the parameters and sets up GPU behavior based on these enable/disable bits. At any time, the VMM software can update the shared memory page and re-send the commands inline with other command buffers thus changing the GPU behavior on the fly. The command causes the GPU to possibly flush internal caches, read the parameter data and switch internal execution behavior on the fly.

In the invention, VMM software can enable each GPU to write performance data into the shared performance data pages. One implementation might compute nanosecond timers for each command buffer from a guest sent to any GPU. The data format written is GPU specific but the offset into the parameters page, enabling this feature, and the size of the buffer (number of pages) is set by initialization of the GPU for sharing. One example of the performance data might be {int uniqueID; uint64 startTime; uint64 endTime;}. In this case, uniqueID is supplied by VMM software when the performance commands are added to the ring buffer commands. The GPU write logic will wrap within the performance buffer when it reaches the end. VMM software can control this behavior using parameter data.

Using the host shared memory that contains the parameter data 1551 the host KMD 1513 or GPU scheduler 1520 may decode and queue up command buffers to a specific GPU in the multi-GPU environment. It may also choose to load balance the command buffers based on host GPU performance data indicating the load on each GPU 1531-1532. The GPU parameter memory 1551 may indicate that there should be one GPU per guest/VM in a DDA-style assignment strategy and/or it may indicate that load balancing should be enabled and the host KMD 1513 or scheduler 1520 will decide how to queue up command buffers to a GPU based on metadata included in each command buffer. For each GPU 1531-1532, there may be a queue or FIFO 1622-1623 (e.g., implemented as a ring buffer). In operation, the command buffers are submitted to a GPU and the performance data is gathered (if enabled). In one embodiment, the performance data includes the type of command buffers and the time delta to execute commands in that GPU. The size of the queue for each GPU is available to the KMD 1513 or GPU scheduler 1520 along with the performance data written by the GPU hardware into the shared performance pages 1552. This information is used to determine how to queue up new command buffers or preempt command buffers in a specific GPU queue. The host KMD 1513 or GPU scheduler 1520 may submit and manage the guest command buffers by collecting and using various different data including, for example: data specifying how to map host GPU to guest OS; an indication of the performance commands attached to submitted command buffers; load balancing techniques/algorithms; whether the command buffers are serialized; whether guest out-of-order hints are ignored; the management of manage GPU assignment to guest OS without meta-data headers; how to apply power management strategies to one or all GPUs in the host; which GPU gets a power management strategy; whether the host KMD 1513 or GPU scheduler 1520 attaches performance commands to submitted command buffers; which GPU(s) control display output (e.g., display should be attached to one or several GPUs); which GPU(s) perform specific tasks such as video decode or video encode; memory context switch time measurement and reporting to performance memory pages 1552; measurement of engine memory context switch time and reporting to performance memory pages 1552; and other management tasks that the system software may require.

In one embodiment, each command buffer from a guest/VM 1501 is submitted to a specific GPU FIFO or queue 1622-1623. The host KMD 1513 or GPU scheduler 1520 may (if enabled) prefix meta-commands to the guest/VM work item. The metadata may include a write GPU performance data command causing its respective GPU to write performance data into the shared performance page and jump-and-return command causing the GPU to jump to the write GPU performance data command and return to the normal instruction sequence. The following types of commands may be used by the host KMD 1513 or GPU scheduler 1520 before and/or after the guest command buffers: write performance data into shared performance memory 1552 (shared with host system software); write GPU engine load data into shared performance memory 1552 (e.g., indicating the current load on the GPU engine); write GPU power consumption data into shared performance memory 1552; write fence data for a specific guest and GPU combination to host memory 1550; write commands to block on a fence value or other barrier until the GPU makes progress; write commands that switch resource destination in the engine (e.g., for video encode); write commands that switch source resources in the GPU engine (e.g., for video decode); and other types of data that might be necessary to manage multiple rendering on multiple GPUs.

In one embodiment, as the GPU 1531 starts to work on that command buffer (e.g., reading commands from its FIFO queue 1622), it reads the host physical address (HPA) of the FIFO command and jumps to the guest/VM 1501 command buffer to execute the commands from guest memory. After finishing all the commands in the guest provided buffer, the GPU 1530 returns to the FIFO memory address immediately after the jump-and-return command. In that memory is a command to write GPU performance data to the shared memory page 1552. Thus the FIFO commands include (1) write GPU performance data into shared performance pages 1552, (2) jump-and-return using HPA, and (3) write GPU performance data into shared performance pages 1552. The write GPU time command may include an HPA inside the shared memory performance pages 1552. The host KMD 1512 or GuC may use the performance to gather the per-command buffer, per-VM performance data and feed that back into the scheduler 1520 or provide the virtualization software 1510 with the ability to make decisions based on GPU performance. This information can be used, for example, to kill shaders running on a specific GPU from a guest VM if the command buffers are taking too long. In this case, the virtualization software 1510 can kill the guest OS or send a kill command into the guest OS. In turn, the guest OS can perform a TDR or timeout for the offending application.

One embodiment of the invention uses GPU nanosecond timers to collect performance data (e.g., sampling the timers before and after the execution of each command or blocks of commands). In this embodiment, the prefix commands on all command buffers include a quadword value to store a start nanosecond time from the GPU hardware and/or an end nanosecond time (e.g., comprising the final performance data writes). This allows the virtualization software 1510 or the scheduler 1520 to determine specific timing for specific command buffers from a guest OS.

One embodiment of the invention uses GPU engine load metrics (i.e., indicating a "busyness" level) for GPU performance data. For example, a bit vector may be written into the shared memory area where each bit indicates whether an engine in the GPU 1530 is busy (1) or idle (0). In this implementation, commands are added to the start of a guest command buffer which include the current bit vector. This information can be used by the host KMD 1513 or GPU scheduler 1520 to submit command buffers of specific types from different guests. For example, if GPU 1531 is busy running a video decode task and the GPU hardware is designed to allow full execution overlap, then the bit vector for that GPU would indicate that the video decode engine is busy but other engines are idle and the scheduler 1520 can therefore submit command buffers for 3D rendering or BLIT operations to the same GPU 1531 (e.g., using a different execution engine within the same GPU hardware).

It is possible for the host KMD 1513 or GPU scheduler 1520 to queue up command buffers to different GPUs 1531-1532 from the same VM 1501. At first this appears to be a problem because out-of-order rendering is not universally correct. The canonical example of order-dependent rendering is transparency using a blend operation with the destination pixel data in a render target. In this case, it is very important that command buffers be submitted in a very specific order. In one embodiment, the guest metadata in the command buffer header contains commands to the host GPU or GPU scheduler. These are meta-commands that instruct the schedulers 1520 to behave in a specific manner. The meta-commands inform the host KMD 1513 or GPU scheduler 1520 to synchronize all command buffers from the VM 1501 and wait until all rendering is finished in all GPUs 1531-1532. Meta-commands can be used to force ordered rendering in which case the host KMD 1513 or GPU scheduler 1520 may force all rendering to one GPU 1531 or impose barriers in the commands so that multiple GPUs can render but one may block until another is at a certain barrier.

If the guest header indicates that synchronization is necessary, then the host KMD 1513 or GPU scheduler 1520 can use fences or other techniques to block the GPU from consuming GPU commands from that guest/VM and instead synchronize the command buffer processing. This means that the host KMD 1513 or GPU scheduler 1520 may append "write DWORD" or "write QWORD" commands to command buffers submitted to any GPU which may then be used to synchronize rendering from a specific guest/VM. The host KMD 1513 or GPU scheduler 1520 may, for example, block on a fence or may send barrier commands to a specific GPU to wait on a barrier object.

If the guest header indicates that serialization is necessary, then the host KMD 1513 or GPU scheduler 1520 can force all command buffers from that guest to one GPU. Since the guest is submitting command buffers with additional header information, it can send command buffer type information. The different types of commands buffers submitted with the header are used by the host KMD 1513 or GPU scheduler 1520 in the submission of command buffers to a specific GPU. The last type of commands are engine-specific, which are sent to the 3D rendering engine, video decode, video encode, display engine, BLIT engine, or other application specific engine.

Figure 17:
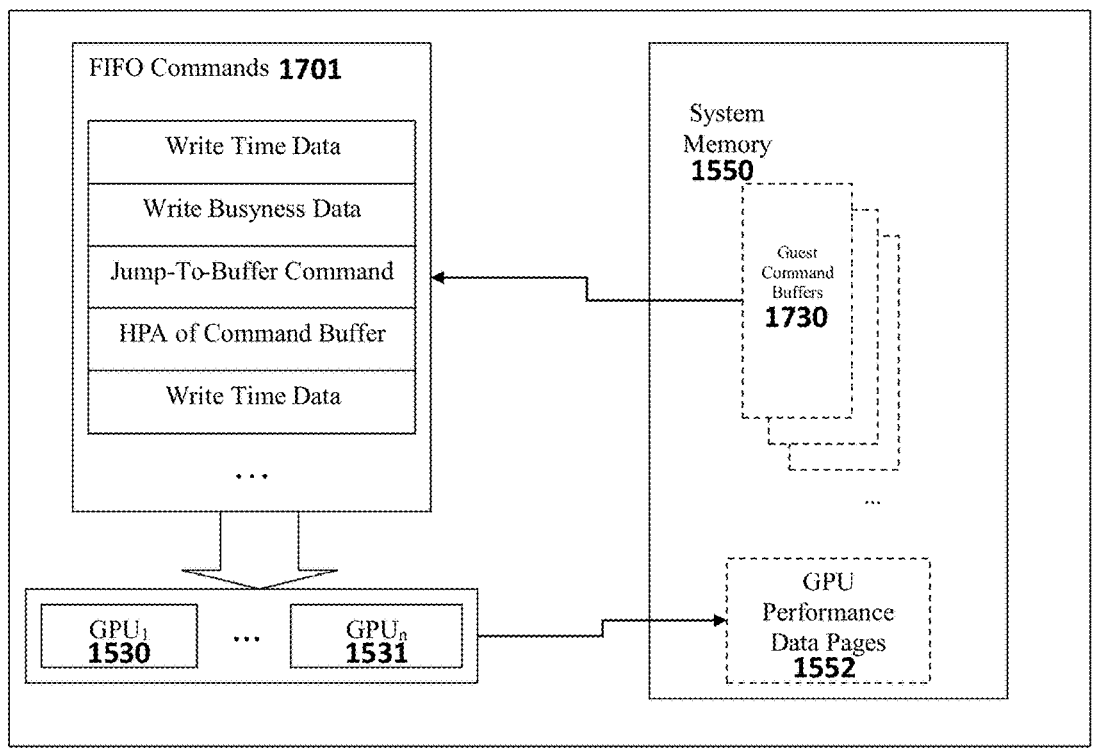
FIG. 17 illustrates a FIFO buffer containing a plurality of exemplary meta-commands.

FIG. 17 illustrates an exemplary embodiment in which a plurality of guest command buffers 1730 are managed in system memory 1550. Commands are read from the command buffers 1730 and stored within one or more FIFO command buffers 1701 prior to execution by the GPUs 1530-1531. The exemplary commands in FIG. 17 include two write time data commands, one write busyness data command, one jump-to-buffer command, and one HPA of command buffer command. In response to execution of the commands, the GPUs 1530-1531 update the GPU performance data pages 1552 in system memory, which may then be read and used for subsequent resource allocation decisions, as described herein.

Figure 18:
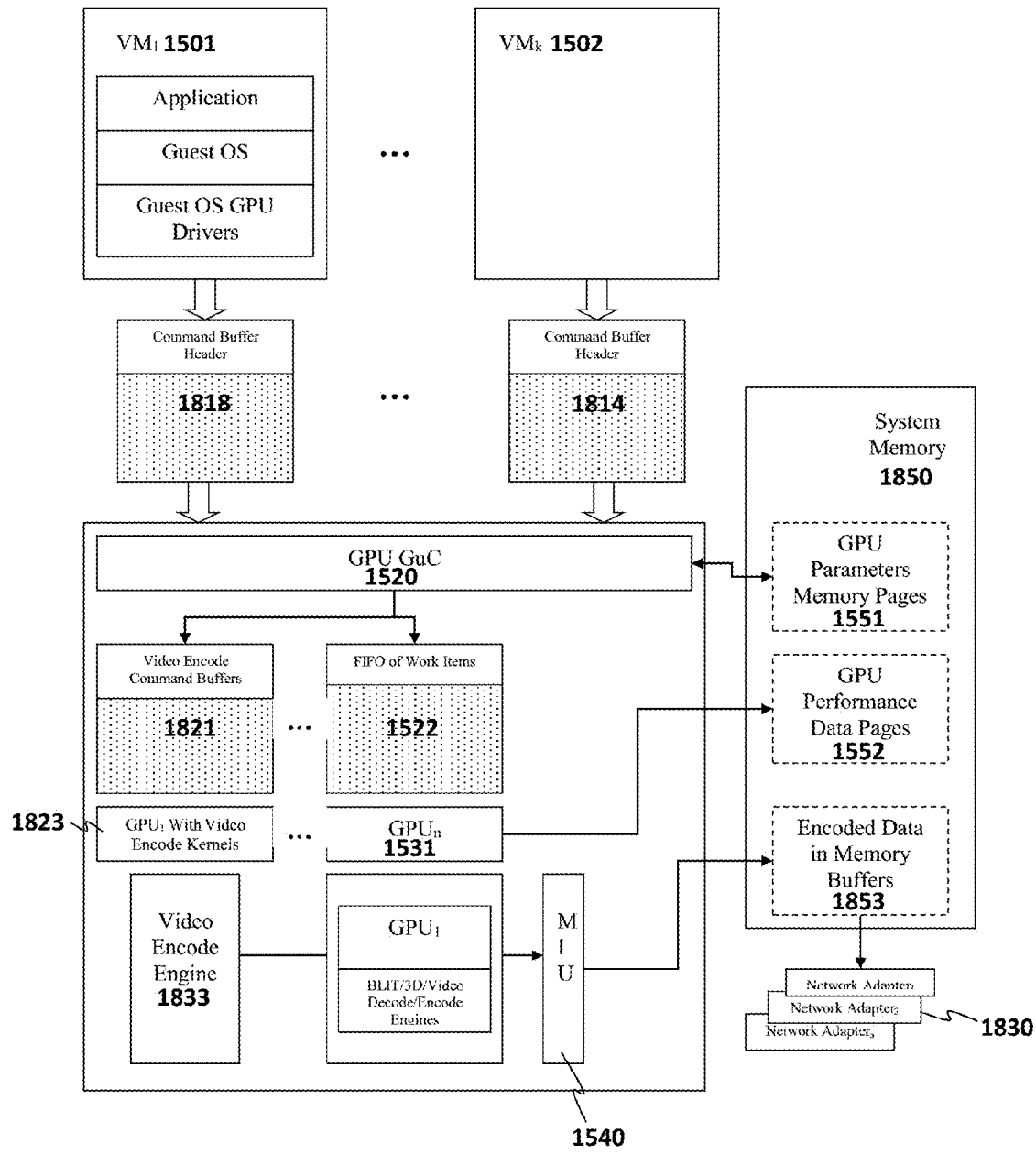
FIG. 18 illustrates one embodiment in which video encode commands are dynamically routed to a designated GPU.

In one embodiment of the invention, illustrated in FIG. 18, all video encode command buffers 1821 from all guests/VMs 1501-1502 are sent to one GPU 1823. This host GPU 1823 is purposely dedicated to video encode by the host software. In this case, the host KMD 1513 or GPU scheduler 1520 switches the render target to the guest designated render target as the outcome of the encode kernels. Just as the performance data and the jump-and-return command are prefixed to the guest/VM command buffer, the switch destination render target or write buffer is command prefixed to the command buffers from the guest. By prefixing the command buffer with a new header, the host KMD 1513 or GPU scheduler 1520 can manage the multiple GPUs and the guest rendering state.

In another embodiment, the encode engine can be used by host software to encode display output from a guest because the guest command buffers have a header 1818, 1814 to indicates the type of commands in the command buffer. Since the guest is submitting command buffers with a header that describes the commands in the buffer, it can designate some command buffers are output to the display. For this case, the host software builds and submits an encode command buffer 1821 to the host KMD 1513 or GPU scheduler 1520 with the destination of the display commands from the guest as the source to the encode GPU 1823, potentially with a specialized video encode engine 1833. The results of the encoding are stored as encoded data in memory buffers 1853. This allows the host software to intercede in the active display commands from a guest and instead encode the final desktop and possibly write the encode buffer data to a network adapter 1830 (e.g., to be streamed to a client utilizing the virtualized graphics architecture described herein). This is one way to implement remote rendering using the embodiments of the invention.

In a similar manner, in one embodiment, all video decode command buffers from all guests/VMs are sent to one GPU. This host GPU is purposely dedicated to video decode by the host software. Since the host KMD 1513 or GPU scheduler 1520 prefixes all command buffers submitted to a specific GPU, it adds a memory context to switch the render target memory context to the command buffers for this case. This embodiment allows the GPU to perform video decode to different render targets or surfaces in memory. The benefit is that one single GPU can be added into the server for video decode and this GPU or set of GPUs can be optimized for these types of command buffers. This is significant because it allows the server to be built for specific tasks that involve graphics operations and the host software to determine how GPU hardware is used.

Figure 19:
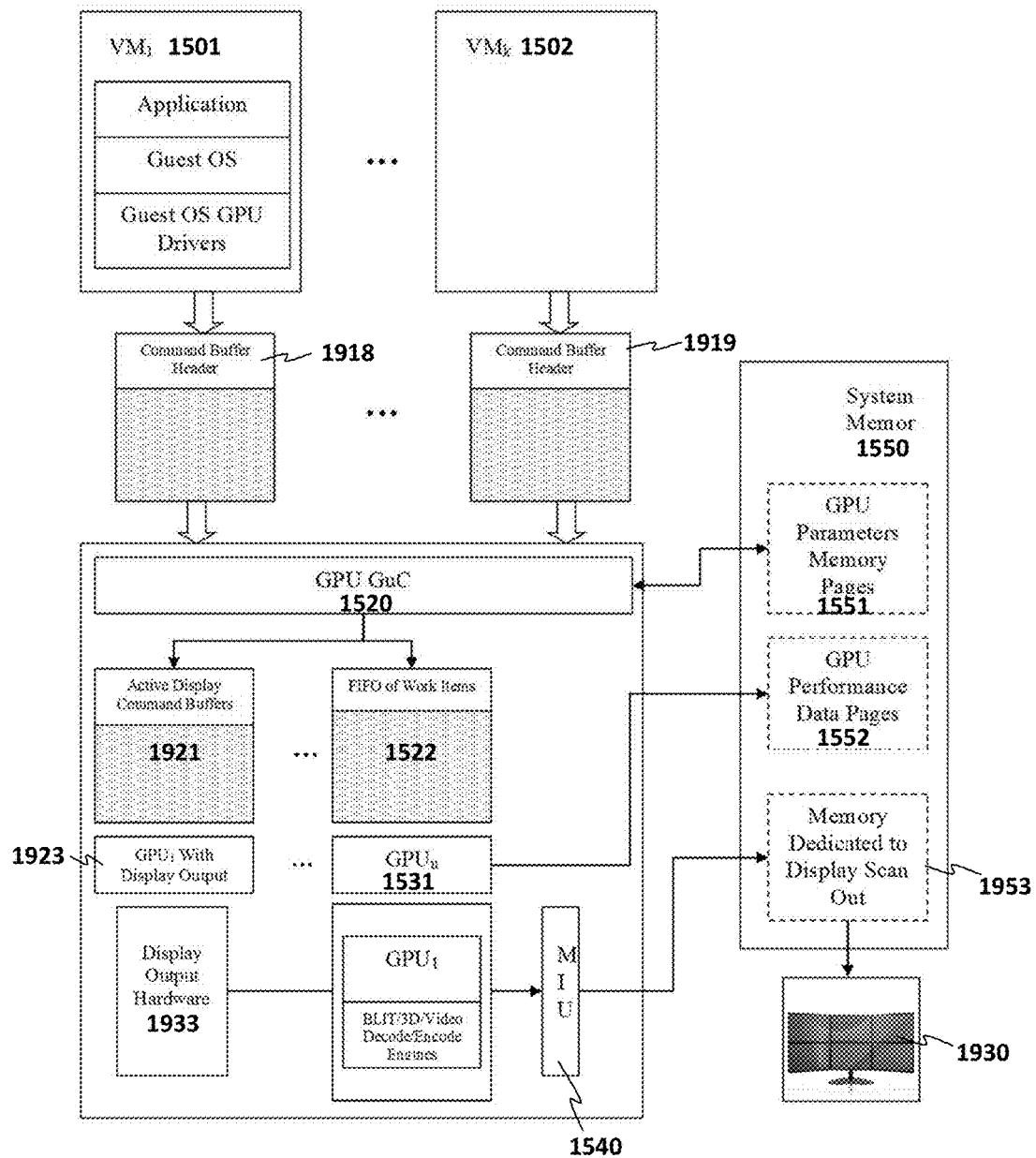
FIG. 19 illustrates one embodiment in which GPU display commands are submitted to a specific GPU.

It is also possible to submit all active display command buffers to a single GPU that controls the display as illustrated in FIG. 19. As in prior embodiments, a command buffer header 1918-1919 indicates the type of commands in the command buffer (e.g., in this case, display commands). The server setup may be part of the host parameters page that the host KMD 1513 or GPU scheduler 1520 uses. This implementation of the invention allows the host software to control the output to the local display 1930 attached to a GPU or multiple GPUs. For example, it is possible to have zero, one or many displays 1930 attached to the server. The host KMD 1513 or GPU scheduler 1520 determines where guest output goes by reading the parameter memory 1551 and sending all guest command buffers with active display to the appropriate GPU 1923 for output. In the illustrated example display output hardware 1933 renders each image frame for display, storing the rendered frames within memory dedicated to the display scan output 1953. This implementation of the invention allows for a console display or a merge of all guest desktops to be output to a GPU with an active display.

In contrast to the embodiments of the invention described above, current solutions to using GPU hardware in a hypervisor virtual machine server environment provide little or no mechanism to efficiently use multiple GPU hardware resources. Existing solutions for using GPUs in a server environment such as DDA or SR-IOV do not allow preemptive GPU hardware context switching based on load balancing algorithms or guest rendering patterns. They also do not allow the hypervisor to control the pre-emption algorithm based on server management software. The problem is that existing solutions do not provide the hypervisor sufficient control over the submission of command buffers to multiple host GPUs based on guest usage patterns or server management software. This can create a situation of under-utilization within the available host GPU domain.

The embodiments of the invention described herein allow the hypervisor to gather data about GPU resource usage as a consequence of host and/or guest command buffer processing. These embodiments utilize techniques to use this data to alleviate bottlenecks and specific rendering tasks to efficiently use host GPU hardware resources. Shared memory allows the hypervisor to gather GPU performance data, enabling various techniques to more efficiently use GPU resources which may include compute execution units, system memory or GPU memory and specific functional engines. In addition, these embodiments define how a hypervisor can use shared memory between the host KMD and metadata from guest drivers to more efficiently use host GPUs in a server with multiple GPUs. With command buffer metadata from a guest and performance data from the GPU, the hypervisor can queue up guest command buffers for specific rendering operations to a host GPU and gain demonstrable improvements in GPU utilization. The hypervisor can use preemptive GPU command buffer submission across multiple GPUs in the server based on guest behavioral patterns. Depending on the server management software, the hypervisor can use different preemption algorithms such as first-come first-serve scheduling, shortest-job-first scheduling or priority scheduling. Pre-emption here refers to common buffer submission from guests and switching usage of host GPU hardware on a per-command buffer basis.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. An apparatus comprising:
a plurality of graphics processing units (GPUs) to be shared by a plurality of virtual machines (VMs) within a virtualized execution environment;
a shared memory to be shared between the plurality of VMs and GPUs executed within the virtualized execution environment;
the GPUs to collect performance data related to execution of commands within command buffers submitted by the VMs, the GPUs to store the performance data within the shared memory, wherein at least one command buffer is tagged with an identifier (ID) of a respective submitting VM, the ID being used for GPU selection; and
a GPU scheduler and/or driver to schedule subsequent command buffers to the GPUs based on the performance data.

2. The apparatus as in claim 1 wherein the GPU scheduler or driver is to implement a load balancing function to perform load balancing across the GPUs and/or individual resources of the GPUs based on the performance data.

3. The apparatus as in claim 2 wherein the performance data specifies a current load on individual resources within one or more of the GPUs and wherein the load balancing function comprises submitting the command buffers based on the current load on the individual resources.

4. The apparatus as in claim 3 wherein the individual resources comprise a GPU three-dimensional (3D) rendering engine, video decode engine, video encode engine, display engine, BLIT engine, and/or other application-specific engine.

5. The apparatus as in claim 4 wherein a bit vector is to be written into the shared memory where each bit indicates whether an engine in each GPU is busy or idle.

6. The apparatus as in claim 1 wherein the GPUs collect the performance data responsive to commands included within the command buffers.

7. The apparatus as in claim 6 wherein the commands include one or more of: write performance data into the shared memory; write GPU engine load data into the shared memory; write GPU power consumption data into the shared memory; write fence data for a specific VM and GPU combination to the shared memory; write commands to block on a fence value or other barrier until the GPU makes progress; write commands that switch resource destination in a GPU engine; and write commands that switch source resources in the GPU engine.

8. The apparatus as in claim 6 further comprising:
a first-in-first out buffer for each GPU to queue commands from the respective command buffer submitted to each GPU.

9. The apparatus as in claim 1 wherein a header is to be added to each of the command buffers to identify types of commands within the respective command buffer.

10. The apparatus as in claim 9 wherein the header may include an indication as to whether serialization is necessary, wherein upon detecting the header, the GPU scheduler or driver causes all commands from that command buffer to be executed by one particular GPU.

11. The apparatus as in claim 9 wherein a first header is to indicate that commands in a first command buffer are to encode video, the GPU scheduler or driver to responsively submit the first command buffer to a GPU having a video encoding engine which is not currently busy; a second header is to indicate that commands in a second command buffer are to decode video, the GPU scheduler or driver to responsively submit the first command buffer to a GPU having a video decoding engine which is not currently busy; and a third header is to indicate that commands in a third command buffer are to render a display output, the GPU scheduler or driver to responsively submit the third command buffer to a GPU having a display engine which is not currently busy.

12. A method comprising:
sharing a plurality of graphics processing units (GPUs) with a plurality of virtual machines (VMs) within a virtualized execution environment;
sharing a memory between the plurality of VMs and GPUs executed within the virtualized execution environment;
collecting performance data related to execution of commands within command buffers submitted by the VMs, the GPUs to store the performance data within the shared memory, wherein at least one command buffer is tagged with an identifier (ID) of a respective submitting VM, the ID being used for GPU selection; and
scheduling subsequent command buffers to the GPUs based on the performance data.

13. The method as in claim 12 further comprising:
implementing a load balancing function to perform load balancing across the GPUs and/or individual resources of the GPUs based on the performance data.

14. The method as in claim 13 wherein the performance data specifies a current load on individual resources within one or more of the GPUs and wherein the load balancing function comprises submitting the command buffers based on the current load on individual resources.

15. The method as in claim 14 wherein the individual resources comprise a GPU three-dimensional (3D) rendering engine, video decode engine, video encode engine, display engine, BLIT engine, and/or other application-specific engine.

16. The method as in claim 15 wherein a bit vector is to be written into the shared memory where each bit indicates whether an engine in each GPU is busy or idle.

17. The method as in claim 12 wherein the GPUs collect the performance data responsive to commands included within the command buffers.

18. The method as in claim 17 wherein the commands include one or more of: write performance data into the shared memory; write GPU engine load data into the shared memory; write GPU power consumption data into the shared memory; write fence data for a specific VM and GPU combination to the shared memory; write commands to block on a fence value or other barrier until the GPU makes progress; write commands that switch resource destination in a GPU engine; and write commands that switch source resources in the GPU engine.

19. The method as in claim 17 further comprising:
a first-in-first out buffer for each GPU to queue commands from the respective command buffer submitted to each GPU.

20. The method as in claim 12 wherein a header is to be added to each of the command buffers to identify types of commands within the respective command buffer.

21. The method as in claim 20 wherein the header may include an indication as to whether serialization is necessary, wherein upon detecting the header, all commands from that command buffer are to be executed by one particular GPU.

22. The method as in claim 20 wherein a first header is to indicate that commands in a first command buffer are to encode video, responsively submitting the first command buffer to a GPU having a video encoding engine which is not currently busy; a second header is to indicate that commands in a second command buffer are to decode video, responsively submitting the first command buffer to a GPU having a video decoding engine which is not currently busy; and a third header is to indicate that commands in a third command buffer are to render a display output, responsively submitting the third command buffer to a GPU having a display engine which is not currently busy.

23. A system comprising:
a memory to store data and program code;
a central processing unit (CPU) comprising an instruction cache for caching a portion of the program code and a data cache for caching a portion of the data, the CPU further comprising execution logic to execute at least some of the program code and responsively process at least some of the data, at least a portion of the program code comprising graphics commands;
a plurality of graphics processing units (GPUs) to be shared by a plurality of virtual machines (VMs) within a virtualized execution environment;
a shared memory to be shared between the plurality of VMs and GPUs executed within the virtualized execution environment;
the GPUs to collect performance data related to execution of graphics commands within command buffers submitted by the VMs, the GPUs to store the performance data within the shared memory, wherein at least one command buffer is tagged with an identifier (ID) of a respective submitting VM, the ID being used for GPU selection; and
a GPU scheduler and/or driver to schedule subsequent command buffers to the GPUs based on the performance data.

24. The system as in claim 23 wherein the GPU scheduler or driver is to implement a load balancing function to perform load balancing across the GPUs and/or individual resources of the GPUs based on the performance data.

25. The system as in claim 24 wherein the performance data specifies a current load on individual resources within one or more of the GPUs and wherein the load balancing function comprises submitting command buffers based on the current load on individual resources.

26. The system as in claim 25 wherein the individual resources comprise a GPU 3D rendering engine, video decode engine, video encode engine, display engine, BLIT engine, and/or other application-specific engine.

27. The system as in claim 23 wherein the GPUs collect the performance data responsive to commands included within the command buffers.

28. The system as in claim 27 wherein the commands include one or more of: write performance data into the shared memory; write GPU engine load data into the shared memory; write GPU power consumption data into the shared memory; write fence data for a specific VM and GPU combination to the shared memory; write commands to block on a fence value or other barrier until the GPU makes progress; write commands that switch resource destination in a GPU engine; and write commands that switch source resources in the GPU engine.

* * * * *